(12) United States Patent
Bahl et al.

(10) Patent No.: US 10,693,206 B2
(45) Date of Patent: Jun. 23, 2020

(54) NONRECIPROCAL DEVICES HAVING RECONFIGURABLE NONRECIPROCAL TRANSFER FUNCTIONS THROUGH NONRECIPROCAL COUPLING

(71) Applicant: The Board of Trustees of the University of Illinois, Urbana, IL (US)

(72) Inventors: Gaurav Bahl, Champaign, IL (US); Christopher Peterson, Champaign, IL (US)

(73) Assignee: Board of Trustees of the University of Illinois, Urbana, IL (US)

(*) Notice: Subject to any disclaimer, the term of this patent is extended or adjusted under 35 U.S.C. 154(b) by 100 days.

(21) Appl. No.: 16/121,915

(22) Filed: Sep. 5, 2018

(65) Prior Publication Data

US 2020/0028232 A1    Jan. 23, 2020

Related U.S. Application Data

(60) Provisional application No. 62/555,237, filed on Sep. 7, 2017.

(51) Int. Cl.
| | | |
|---|---|---|
| *H01P 1/32* | (2006.01) | |
| *H01P 1/36* | (2006.01) | |
| *H01P 1/38* | (2006.01) | |
| *H01P 5/18* | (2006.01) | |
| *G02B 6/42* | (2006.01) | |

(52) U.S. Cl.
CPC ............. *H01P 1/32* (2013.01); *G02B 6/4208* (2013.01); *H01P 1/36* (2013.01); *H01P 1/38* (2013.01); *H01P 5/18* (2013.01)

(58) Field of Classification Search
CPC .. H01P 5/18; H01P 5/181; H01P 5/182; H01P 5/183; H01P 5/184; H01P 1/32; H01P 1/36; H01P 1/38; H01P 1/387; G02B 6/4208; G02F 1/093
USPC ......... 333/1.1, 24.2, 204, 109, 110, 113, 116
See application file for complete search history.

(56) References Cited

U.S. PATENT DOCUMENTS

| | | |
|---|---|---|
| 6,963,254 B1 | 11/2005 | How |
| 9,424,665 B1 | 8/2016 | Frazier et al. |
| 9,536,512 B2 | 1/2017 | Alu et al. |

(Continued)

OTHER PUBLICATIONS

Arimondo, E., "Coherent Population Trapping in Laser Spectroscopy," In Progress in Optics, vol. 35, 257-354, Elsevier, Amsterdam, 1996, JILA Pub. 5423.

(Continued)

*Primary Examiner* — Stephen E. Jones
(74) *Attorney, Agent, or Firm* — Lowenstein Sandler LLP

(57) ABSTRACT

A nonreciprocal device includes a waveguide through which waves at a first frequency propagate with a first wavevector and with a second wavevector in a direction opposite to the first wavevector; a frequency-dependent device that operates within a frequency range and modifies the waves through the waveguide in a way that is dependent on the first frequency; and a set of couplers to couple the waveguide and the frequency-dependent device. Coupling rates of the set of couplers are modulated to enable nonreciprocal coupling, with respect to the frequency-dependent device, of the first wavevector compared to the second wavevector.

23 Claims, 13 Drawing Sheets

(56) References Cited

U.S. PATENT DOCUMENTS

2012/0189246 A1* 7/2012 Hofrichter ......... G02B 6/12007
385/14

OTHER PUBLICATIONS

Bahl, G., Tomes, M., Marquardt, F., Carmon, T., "Observation of Spontaneous Billouin Cooling," Nataure Physics, vol. 8, pp. 203-207, Jan. 22, 2012.
Bahl, G., Zehnpfennig, J., Tomes, M., Carmon, T., "Stimulated Optomechanical Excitation of Surface Acoustic Waves in a Microdevice," Nat. Commun. 2, 403, 6 pages, Jul. 26, 2011.
Boller, K.-J., Imamogul, A., Harris, S. E., "Observation of Electromagnetically Induced Transparency," Phys. Rev. Lett. vol. 66, No. 20 2593-2596, May 20, 1991.
Cai, M., Painter, O., & Vahala, K. J., "Observation of Critical Coupling in a Fiber Taper to a Silica-Microsphere Whispering-Gallery Mode System," Physical Review Letters, vol. 85, No. 1, 74-77, Jul. 3, 2000.
Casimir, H. B. G., "Reciprocity Theorems and Irreversible Processes," Proceedings of the IEEE, 51, pp. 1570-1573, Nov. 1963.
Dong, C., Fiore, V., Kuzyk, M. C., & Wang, H., "Optomechanical Dark Mode," Science, vol. 338, 1609-1613, Dec. 21, 2012.
Dong, C.-H., et al., "Brillouin-Scattering-Induced Transparency and Non-Reciprocal Light Storage," Nature Communications 6, 6193, 6 pages, Feb. 4, 2015.
Estep, N. A., Sounas, D. L., Soric, J. & Alu, A., "Magnetic-Free Non-Reciprocity and Isolation Based on Parametrically Modulated Coupled-Resonator Loops," Nature Physics vol. 10, pp. 923-927, Nov. 10, 2014.
Estep, N.A., Sounas, D. L. & Alu, A., "Magnetless Microwave Circulators Based on Spatiotemporally Modulated Rings of Coupled Resonators," IEEE Transactions on Microwave Theory and Techniques vol. 64, No. 2, pp. 502-518, Feb. 2016.
Fan, S., Suh, W., & Joannopoulos, J. D., "Temporal Coupled-Mode Theory for the Fano Resonance in Optical Resonators," J. Opt. Soc. Am. A vol. 20, No. 569-572, Mar. 2003.
Fang, K., Yu, Z., & Fan, S., "Experimental Demonstration of a Photonic Aharonov-Bohm effect at Radio Frequencies," Physical Review B 87, 060301(R) 4 pages, (2013).
Fang, K., Yu, Z., & Fan, S., "Photonic Aharonov-Bohm effect Based on Dynamic Modulation," Physical Review Letters 108, 153901, 5 pages, (2012).
Fleury, R. Sounas, D. L., Sieck, C.F., Haberman, M. R. & Alu, A., "Sound Isolation and Giant Linear Non-Reicprocity in a Compact Acoustic Circulator," Science vol. 343, pp. 516-519, Jan. 31, 2014.
Guo, Q.-H., Kang, M., Li, T.-F., Cui, H.-X., Chen, J., "Slow Light from Sharp Dispersion by Exciting Dark Photonic Angular Momentum States," Optics Letters vol. 38, No. 3, 250-252, Feb. 1, 2013.
Hafezi, M. & Rabl, P. "Optomechanically Induced Non-Reciprocity in Microring Resonators," Optics Express vol. 20, No. 7, pp. 7672-7684, Mar. 26, 2012.
Hogan, C.L. "The Ferromagnetic Faraday Effect at Microwave Frequencies and its Applications—The Microwave Gyrator," The Bell System Technical Journal vol. 31, No. 1, pp. 1-31, Jan. 1952.
Hryniewicz, J. V., Absil, P. P., Little, B. E., Wilson, R. A., Ho, P.-T., "Higher Order Filter Response in Coupled Microring Resonators," IEEE Photonics Technology Letters, vol. 12, No. 3, 320-322, Mar. 2000.
Hsu, C. W., Zhen, B., Stone, A. D., Joannopoulos, J.D. & Soljacic, M., "Bound States in the Continuum," Nature Review Material vol. 1, 16048, Sep. 2016.
Hwang, I., K., Yun, S. H., Kim, B. Y., "All-Fiber-Optic Nonreciprocal Modulator," Opt. Lett. vol. 22, No. 8, 507-509, Apr. 15, 1997.
Jalas, D. et al., "What is—and What is Not—an Optical Isolator," Nature Photonics vol. 7, pp. 579-582, Aug. 2013.
Kamal, A., Clarke, J. & Devoret, M.H., "Noiseless Non-Reciprocity in a Parametric Active Device," Nature Physics vol. 7, pp. 311-315, Jan. 30, 2011.
Kang, M. S. Butsch, A. & Russell, P. S. J., "Reconfigurable Light-Driven Opto-Acoustic Isolators in Photonic Crystal Fibre," Nature Photonics vol. 5, 549-553, Sep. 2011.
Kim, J., Kim, S., Bahl, G., "Complete Linear Optical Isolation at the Microscale with Ultralow Loss," Sci. Rep. 7, 1647, 2017.
Kim, J., Kuzyk, M. C., Han, K., Wang H. & Bahl, G., "Non-Reciprocal Brillouin Scattering Induced Transparency," Nature Physics vol. 11, pp. 275-280, Jan. 26, 2015.
Kim, S., Bahl, G., "Role of Optical Density of States in Brillouin Optomechanical Cooling," Optic Express vol. 25, No. 2, pp. 776-784, Jan. 2017.
Kim, S., Xu, X., Taylor, J. M., Bahl, G., "Dynamically Induced Robust Phonon Transport and Chiral Cooling in an Optomechanical System," Nat. Commun. 8, 205, 7 pages, 2017.
Kittlaus, E. A., Otterstrom, N. T., Rakich, P. T., "On-Chip Inter-Modal Brillouin Scattering," Nat. Commun. 8, 15819, 9 pages, Jul. 7, 2017.
Lira, H. Yu, Z., Fan, S. & Lipson, M., "Electrically Driven NonReciprocity Induced by Interband Photonic Transition on a Silicon Chip," Physical Review Letters 109, 033901, 5 pages, 2012.
Little, B. E., Chu, S. T., Haus, H. A., Foresi, J., Laine, J.-P., "Microring Resonator Channel Dropping Filters", Journal of Lightwave Technology, vol. 15, No. 6, 998-1005, Jun. 1997.
Maznev, A. A., Every, A. G. & Wright, O. B. "Reciprocity in Reflection and Transmission: What is a 'Phonon Diode'?," Wave Motion 50, pp. 776-784, 2013.
Orta, R., Savi, P., Tascone, R., & Trinchero, D., "Synthesis of Multiple-Ring-Resonator Filters for Optical Systems," IEEE Photonics Technol. Letters, vol. 7, No. 12, pp. 1447-1449, Dec. 1995.
Pant, R. et al., "On-Chip Stimulated Brillouin Scattering," Opt. Express vol. 19, No. 9, 8285-8290, Apr. 25, 2011.
Poulton, C. G. et al., "Design for Broadband On-Chip Isolator Using Stimulated Brillouin Scattering in Dispersion-Engineered Chalcogenide Waveguides," Optics Express vol. 20, No. 19, 21235-21246, Sep. 10, 2012.
Qin, S., Xu, Q. & Wang, Y.E., "Nonreciprocal Components with Distributedly Modulated Capacitors," IEEE Transactions on Microwave Theory and Techniques vol. 62, No. 10, pp. 2660-2272, Oct. 2014.
Reiskarimian, N. & Krishnaswamy, H., "Magnetic-Free Non-Reciprocity Based on Staggered Commutation," Nature Communications 7, 11217, 10 pages, Apr. 15, 2016.
Seif, A. DeGottardi, W., Esfarjani, K., Hafezi, M., "Thermal Management and Non-Reciprocal Control of Phonon Flow via Optomechanics," Nat. Commun. 9, 1207, 8 pages, 2018.
Shen, Z., et al., "Experimental Realization of Optomechanically Induced Non-Reciprocity," Nature Photonics 10, pp. 657-661, Aug. 22, 2016.
Shi, Y., Han, S., Fan, S., "Optical Circulation and Isolation Based on Indirect Photonic Transitions of Guided Resonance Modes," ACS Photonics 4, pp. 1639-1645, 2017.
Strutt, J. W., "Some General Theorems Relating to Vibrations," Proceeding of the London Mathematical Society 4, 357-368, Jun. 12, 1873.
Suh, W., Wang, Z. & Fan, S., "Temporal Coupled-Mode Theory and the Presence of Non-Orthogonal Modes in Lossless Multimode Cavities," IEEE Journal of Quantum Electronics vol. 40, No. 10, pp. 1511-1518, Oct. 2004.
Tzuang, L., D., Fang, K., Nussenzveig, P., Fan, S. & Lipson, M., "Non-Reciprocal Phase Shift Induced by an Effective Magnetic Flux for Light," Nature Photonics vol. 8, pp. 701-705, Aug. 3, 2014.
Yang, M. et al., "Manipulation of Dark Photonic Angular Momentum States via Magneto-Optical Effect for Tunable Slow-Light Performance," Optics Express vol. 21, No. 21, pp. 25035-25044, Oct. 21, 2013.
Yu, C.-C. & Chang, K., "Transmission-Line Analysis of a Capacitively Coupled MicroStrip-Ring Resonator," IEEE Transaction on Microwave Theory and Techniques vol. 45, No. 11, pp. 2018-2024, Nov. 1997.

(56) References Cited

OTHER PUBLICATIONS

Yu, Z., & Fan, S., "Complete Optical Isolation Created by Indirect Interband Photonic Transitions," Nature Photonic vol. 3, pp. 91-94, Apr. 15, 2009.

* cited by examiner

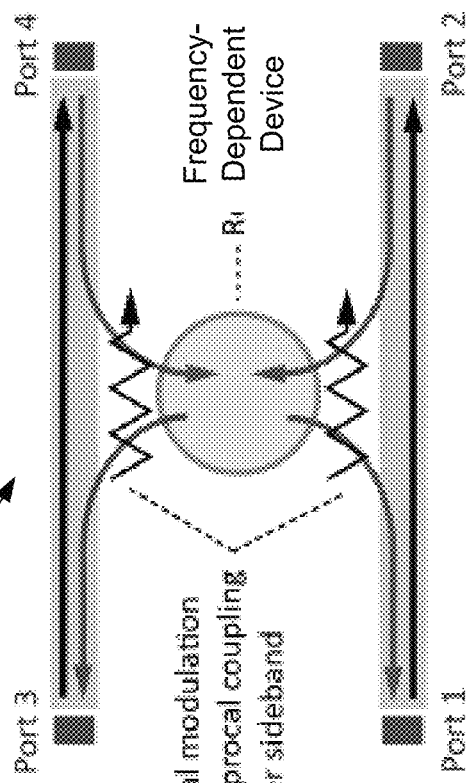
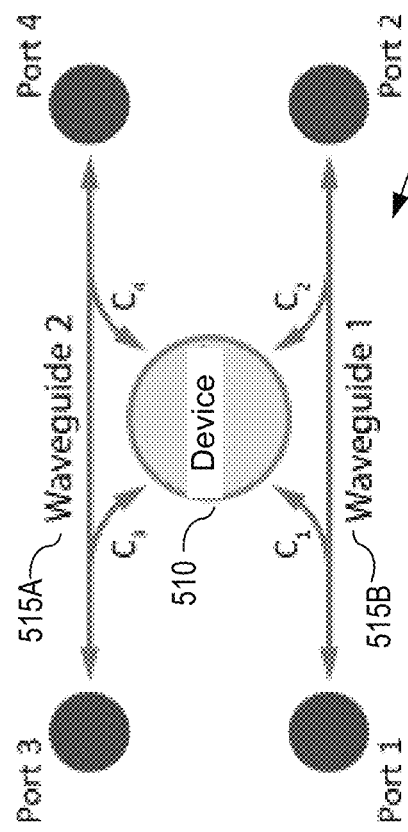
FIG. 5A
FIG. 5B

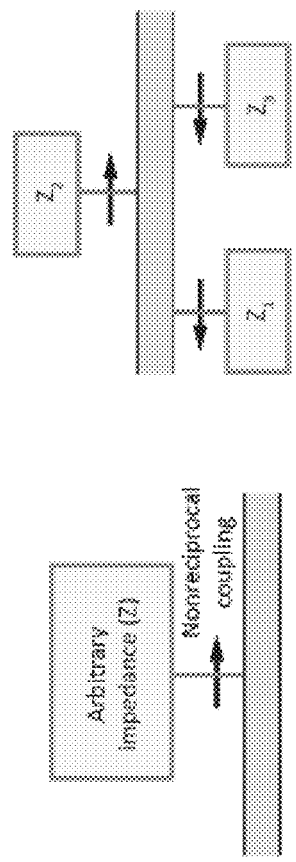
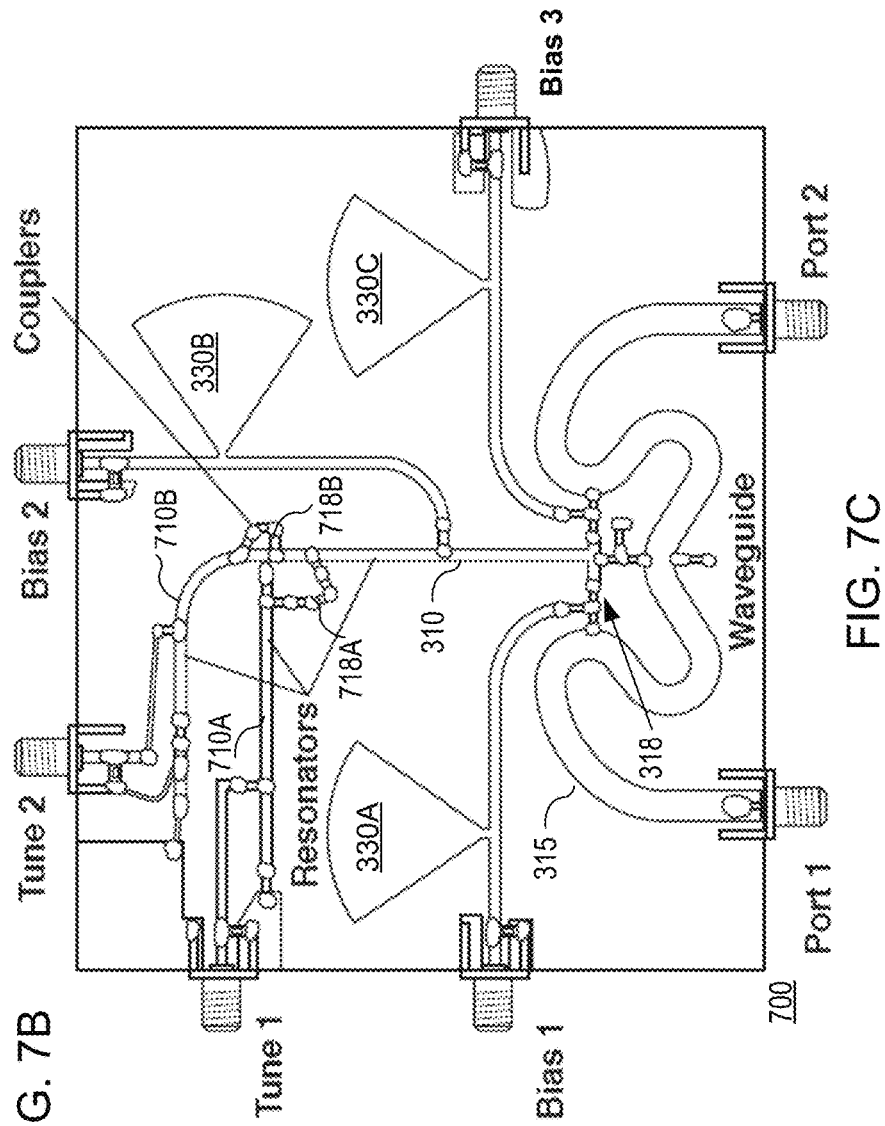
FIG. 7A
FIG. 7B
FIG. 7C

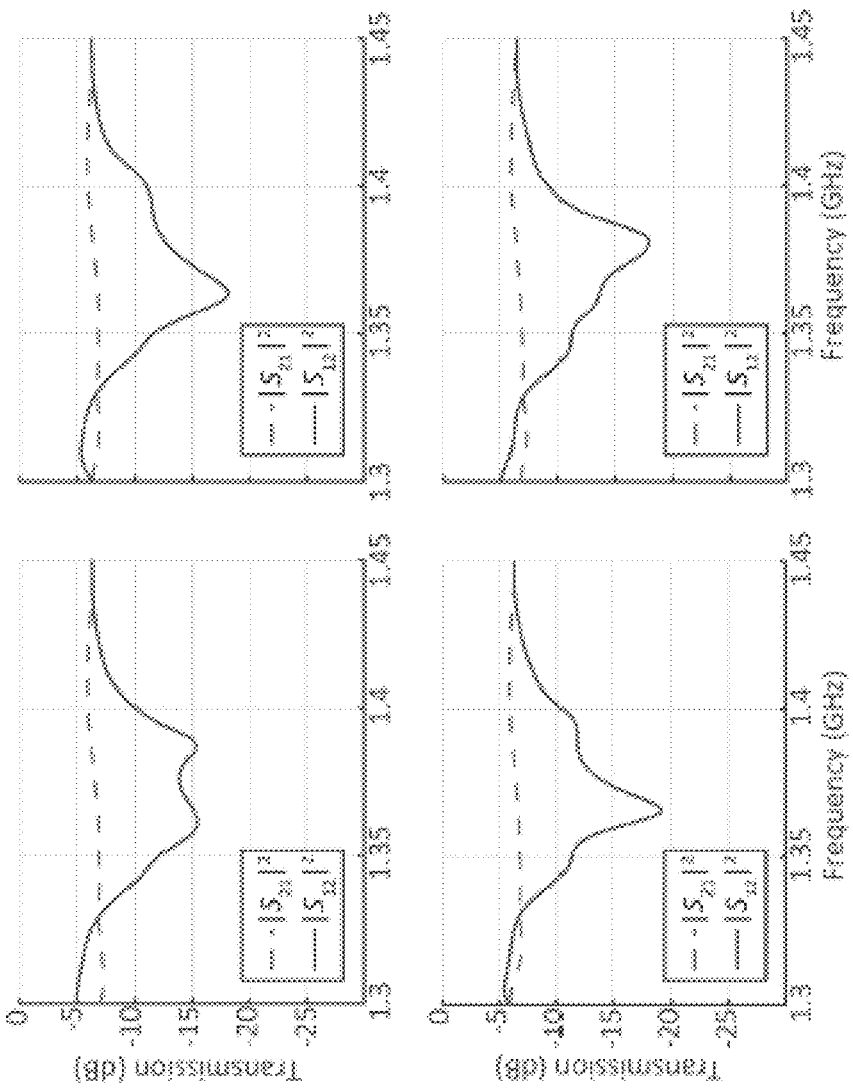
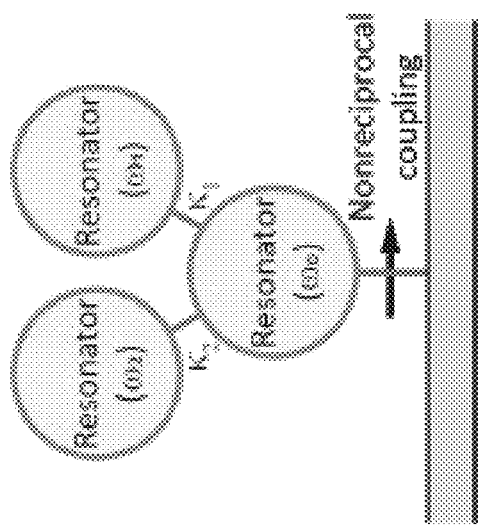
FIG. 7D
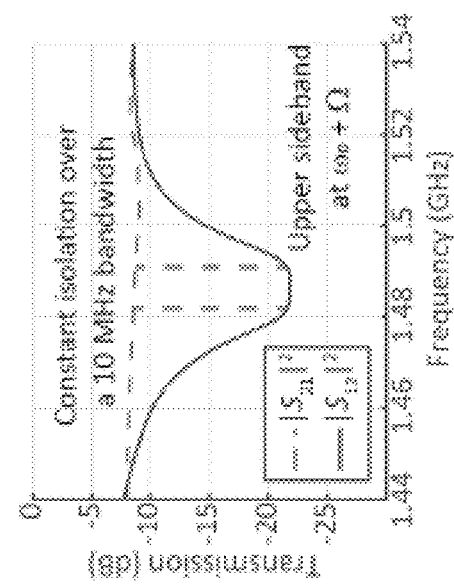
FIG. 7E
FIG. 7F

NONRECIPROCAL DEVICES HAVING RECONFIGURABLE NONRECIPROCAL TRANSFER FUNCTIONS THROUGH NONRECIPROCAL COUPLING

REFERENCE TO EARLIER FILED APPLICATION

This application claims benefit under 35 U.S.C. § 119(e) of U.S. Provisional Patent Application No. 62/555,237, filed Sep. 7, 2017, which is incorporated herein by this reference in its entirety.

FEDERALLY SPONSORED RESEARCH OR DEVELOPMENT

This invention was made with government support under EFMA1627184 awarded by the National Science Foundation and under N00014-16-1-2830 awarded by the United States Navy. The government has certain rights in the invention.

TECHNICAL FIELD

The present disclosure relates to the creation of nonreciprocal devices, and more particularly, to creating nonreciprocal devices having reconfigurable nonreciprocal transfer functions through nonreciprocal coupling.

BACKGROUND

Reciprocity is a fundamental property of wave propagation in linear time-invariant (LTI) media that implies invariance of a system when its inputs and outputs are exchanged and arises due to the symmetry of the medium under time-reversal. Devices that are nonreciprocal can be built by breaking the time-reversal symmetry of the medium.

Inducing nonreciprocal wave propagation is a fundamental challenge across a wide range of physical systems in electromagnetics, optics, and acoustics. Recent efforts to create nonreciprocal devices have departed from established magneto-optic methods and instead exploited momentum based techniques such as coherent spatiotemporal modulation of resonators and waveguides. However, to date the nonreciprocal frequency responses that such devices can achieve have been limited, mainly to either broadband or Lorentzian-shaped transfer functions.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

according to an embodiment.

Figure 3A:
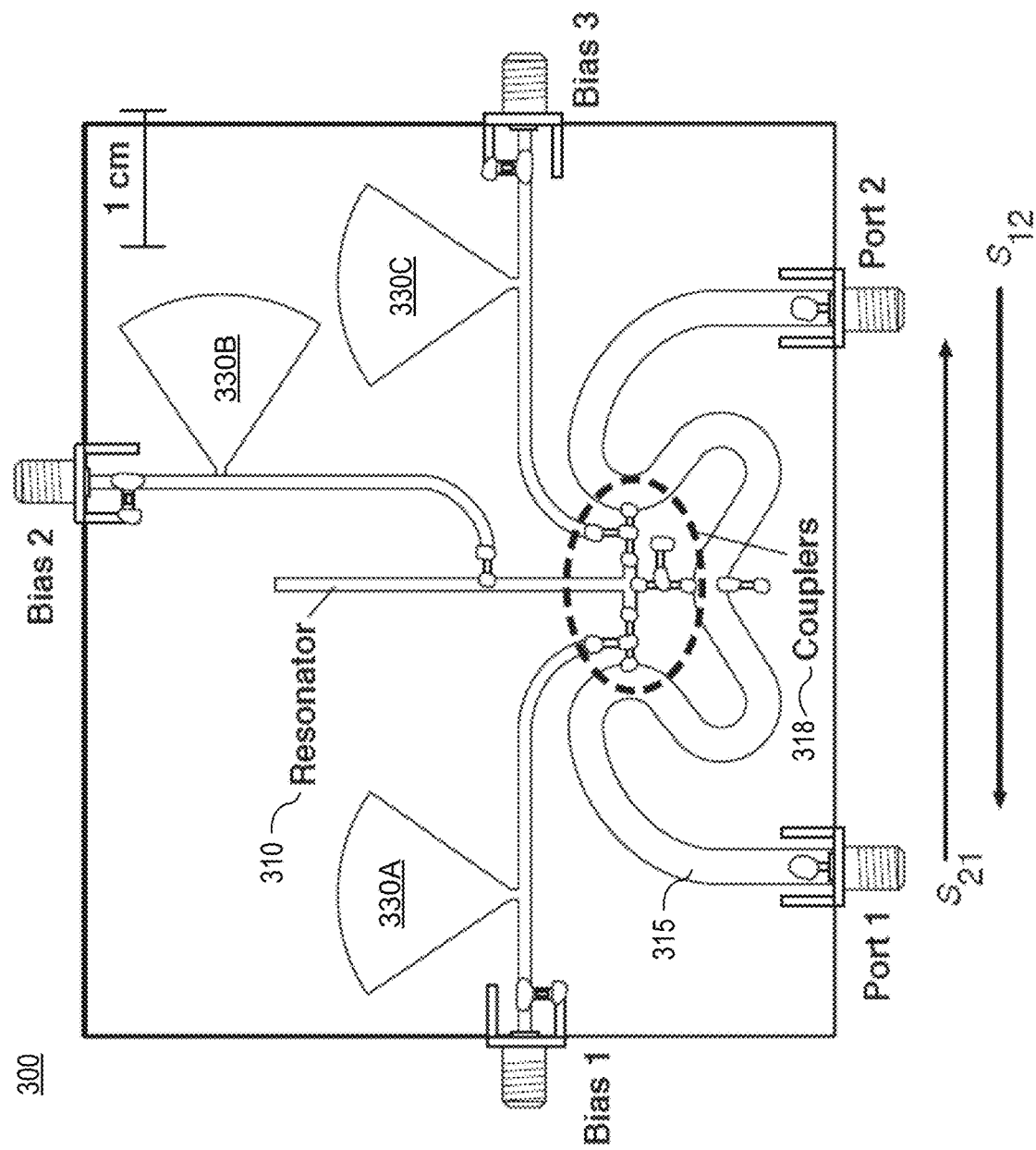
FIG. 3A is an image of an experimental microstrip circuit for testing nonreciprocal resonant absorption from nonreciprocal coupling between a microstrip waveguide and a stub resonator according to an embodiment.
Figure 3B:
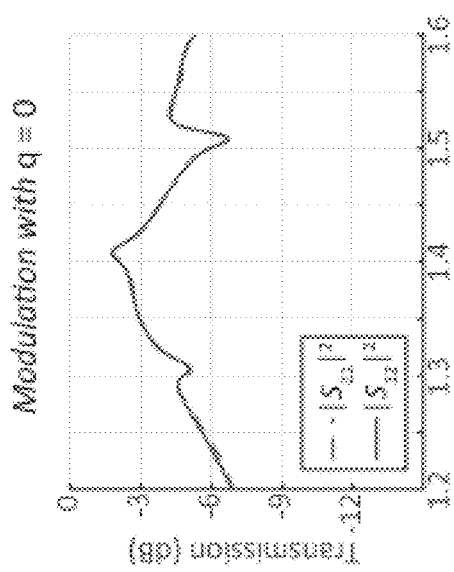
FIG. 3B is a graph illustrating measured power transmission without spatiotemporal modulation applied to the coupling rate according to an embodiment.
Figure 3C:
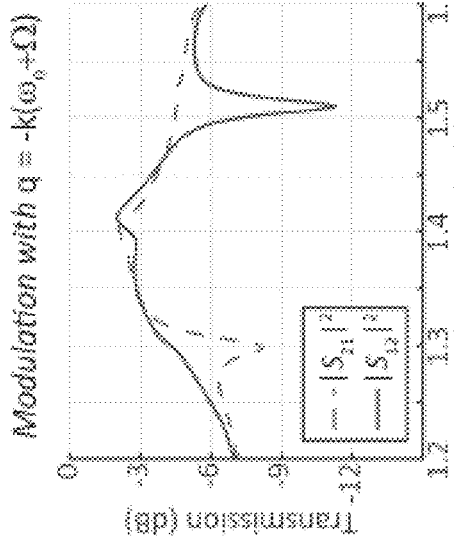
FIG. 3C is a graph of spatiotemporal modulation with wavevector q applied such that $-k(\omega_0+\Omega)-q=0$, enabling nonreciprocal coupling to the resonator of FIG. 3A according to an embodiment.
Figure 3E:
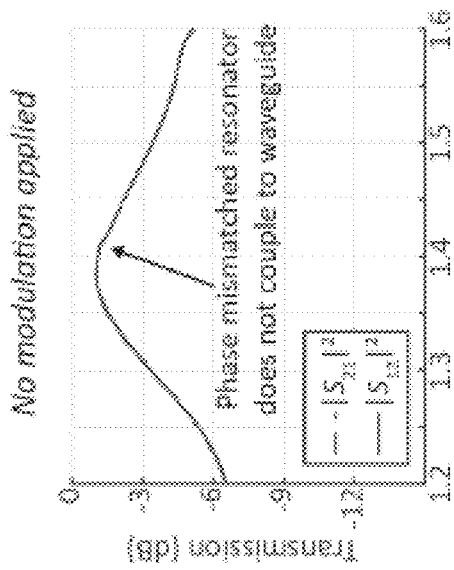
FIG. 3D is a wavevector-based graph illustrating the resonance being broadened in k-space, since the finite number of coupling sites (N=3) only completely destructively interfere for $$k = \pm \frac{2\pi}{3\ell}$$

FIG. 3E is a graph illustrating spatiotemporal modulation with q=0, or no wavevector shift, according to an embodiment.

Figure 3D:
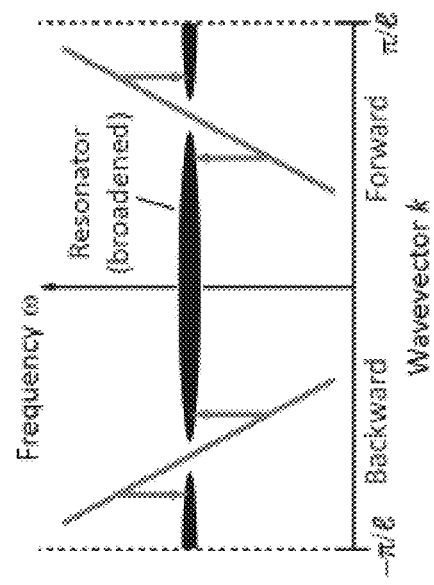
Figure 3F:
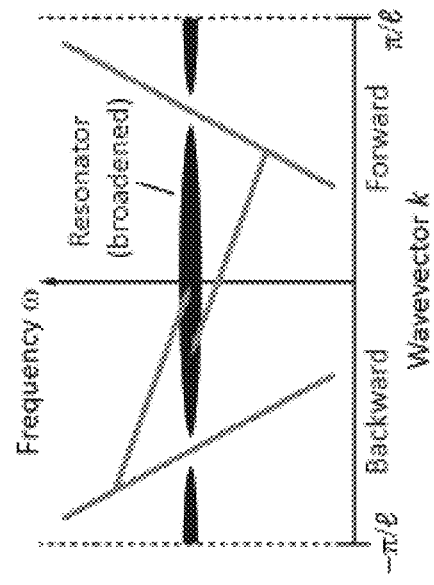

FIG. 3F is a wavevector-based graph illustrating the resonance that generates reciprocal coupling according to an embodiment.

FIGS. 4A, 4B, 4C, 4D, 4E, 4F are graphs illustrating experimental demonstration of nonreciprocal functions in which nonreciprocal coupling is enabled by spatiotemporal modulation of the coupling rate with the wave wavevector q, but varying amplitude, according to various embodiments.

FIG. 5A is a schematic diagram of a pair of waveguides and a frequency-dependent device, illustrating four corresponding coupling constants according to an embodiment.

FIG. 5B is a schematic of a proposed circulator design employing the four-port waveguide and frequency-dependent device illustrated in FIG. 5A according to an embodiment.

Figure 5C:
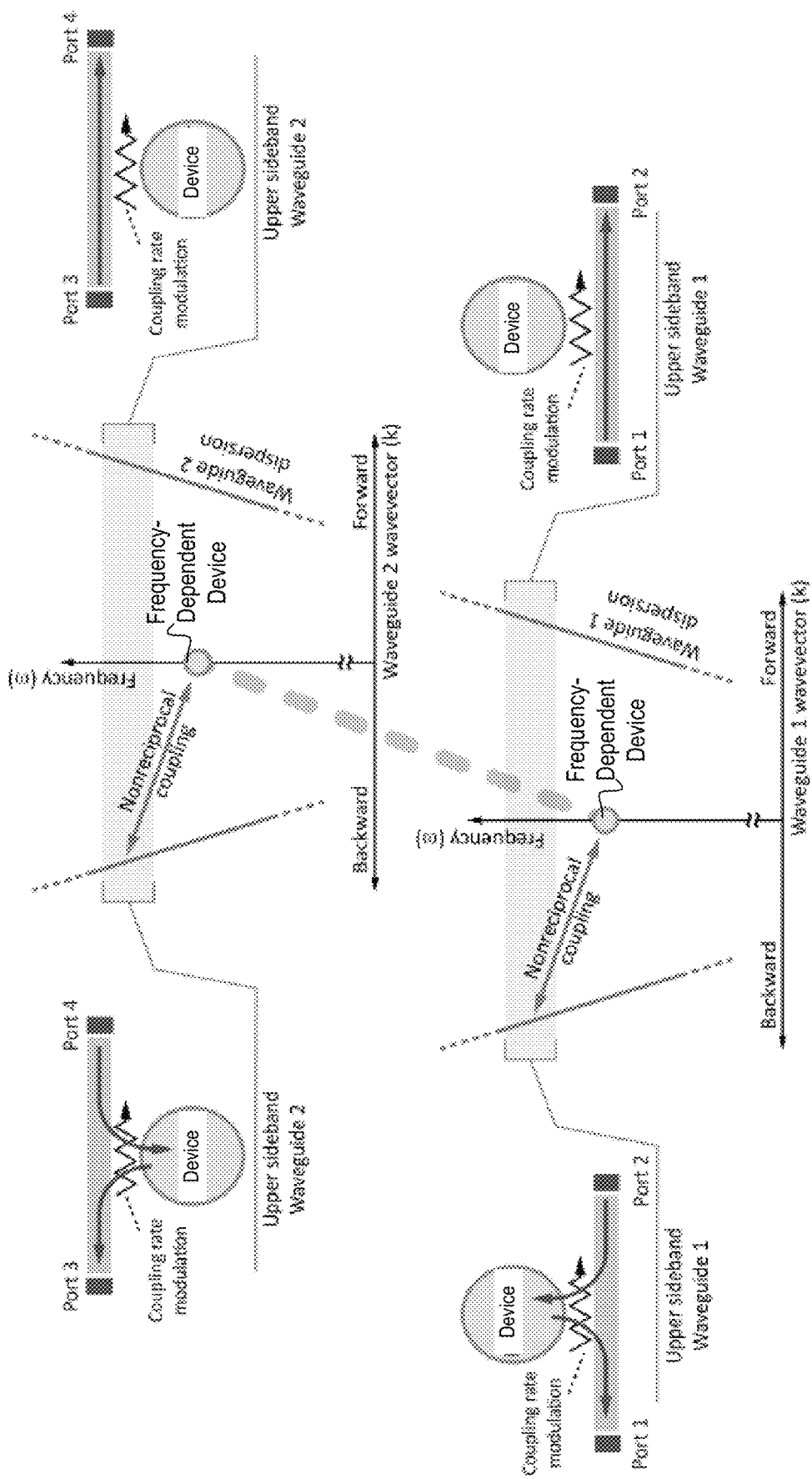

FIG. 5C is a frequency-momentum diagram illustrating nonreciprocal coupling (double-sided arrows) at the upper sideband, as used in the circulator design of FIG. 5B according to an embodiment.

Figure 6B:
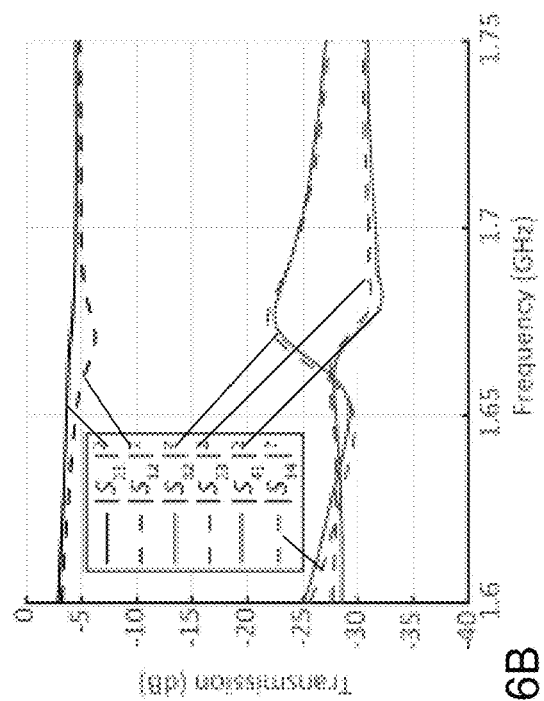
Figure 6A:
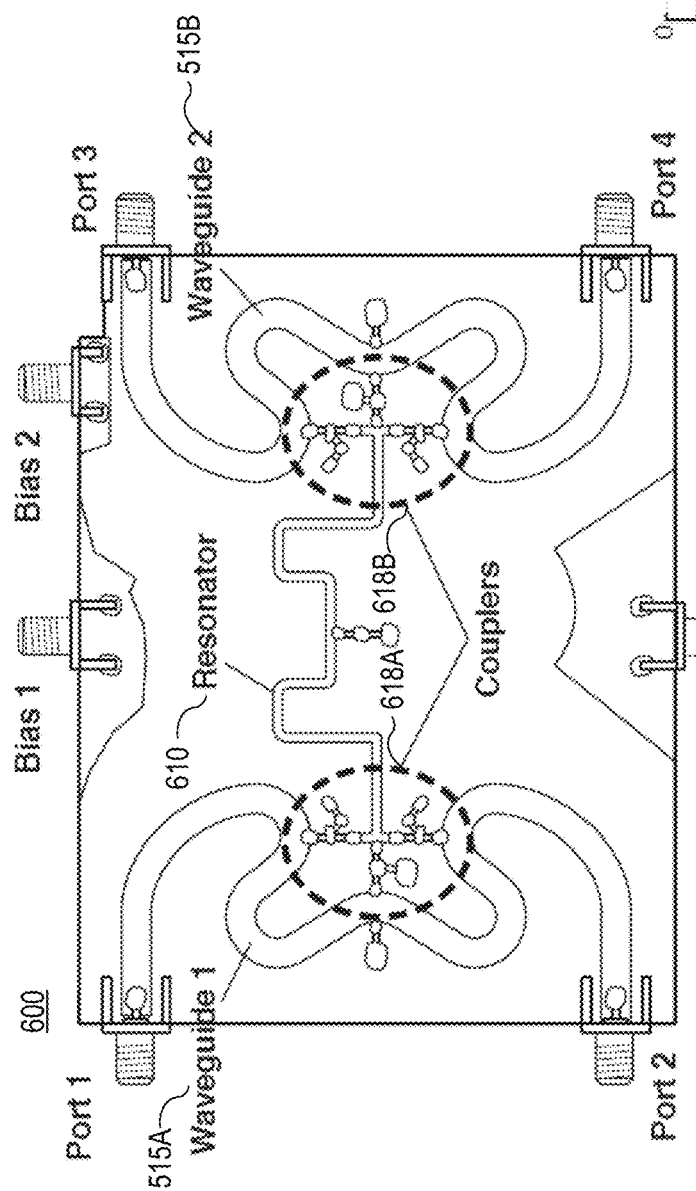

FIG. 6A is an image of a microstrip circuit implementation of the circulator design of FIG. 5B with three coupling sites between each waveguide and the resonator according to an embodiment.

FIG. 6B is a graph illustrating the measured power transmission for the circuit in FIG. 6A according to an embodiment.

FIG. 7A is an electronic component symbol for nonreciprocal coupling to an arbitrary band-limited impedance network according to an embodiment.

FIG. 7B is a schematic diagram of several of the impedance networks of FIG. 7A that may be simultaneously coupled in either direction to create customizable response according to an embodiment.

FIG. 7C is an image of a microstrip circuit used to demonstrate customizable nonreciprocal transfer functions according to an embodiment.

FIG. 7D is a schematic diagram illustrating the microstrip circuit of FIG. 7C according to an embodiment.

FIG. 7E is a graph of a measured power transmission of the microstrip circuit of FIG. 7D, illustrating a flat band over which a constant isolation response is obtained according to an embodiment.

FIG. 7F is a set of graphs illustrating experimental demonstration of four distinct nonreciprocal transfer functions obtained by tuning the resonator network according various embodiments.

Figure 8A:
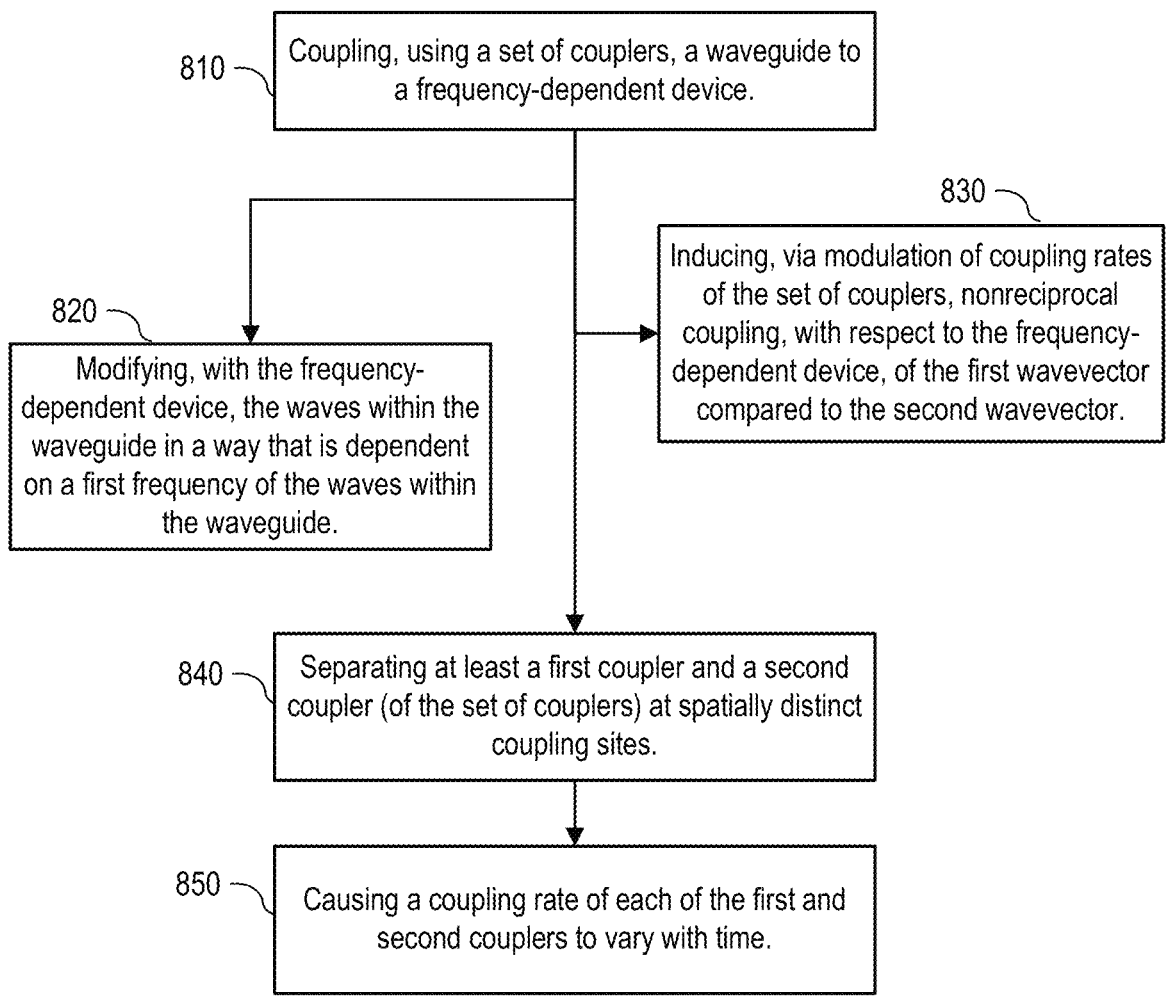

FIG. 8A is a method for creating and operating a nonreciprocal device with a reconfigurable transfer function formed through nonreciprocal coupling according to one embodiment.

Figure 8B:
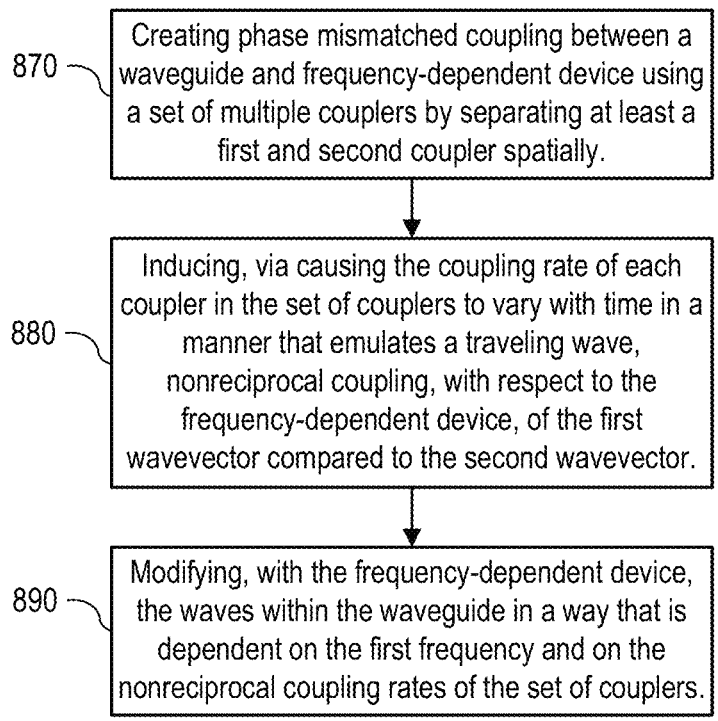

FIG. 8B is a method for creating a nonreciprocal device with a reconfigurable transfer function formed through nonreciprocal coupling according to another embodiment.

DETAILED DESCRIPTION

By way of introduction, the current disclosure illustrates that nonreciprocal coupling between waveguides and frequency-dependent device networks enables the creation of devices with customizable nonreciprocal frequency responses. We create nonreciprocal coupling by spatiotemporally modulating the coupling constant between a waveguide and a frequency-dependent device such as a resonator, a network of coupled resonators, an antenna, an amplifier, an oscillator, a sensor, or the like. We implemented nonreciprocal coupling in microstrip circuits and experimentally demonstrated both elementary nonreciprocal functions such as isolation and gyration as well as reconfigurable, higher-order nonreciprocal filters. Our results suggest nonreciprocal coupling as platform for a broad class of customizable nonreciprocal systems, adaptable to all wave phenomena, such as but not limited to: an isolator, a circulator, a gyrator, a full-duplex antenna, a nonreciprocal filter, and the like.

The interactions between waves (radio-frequency electromagnetic waves, pressure waves, density waves, acoustic waves, and the like) are dictated by both momentum and energy conservation, which may be broadly termed as phase matching. These conservation laws especially apply in the field of nonlinear optics, as inelastic scattering of light involving the creation or annihilation of propagating acoustic waves can produce large shifts in the light's wavevector. A wavevector is a vector that describes the spatial properties of a wave in both magnitude and direction. The magnitude is either the wavenumber or angular wavenumber of the wave (inversely proportional to the wavelength) and its direction is usually the direction of wave propagation.

Shifts in the wavevector induced by propagating acoustic waves in turn permit unique phenomena such as indirect interband photonic transitions, where light is scattered between two optical modes having different frequencies and wavevectors. Indirect interband transitions and similar processes associated with significant wavevector shifts have recently been identified as promising tools for inducing nonreciprocal transmission of light and sound without reliance on magnetic fields. Devices based on these effects break reciprocity because wavevector shifts are not symmetric under time-reversal. To date, nonreciprocal devices based on indirect photonic transitions have exclusively relied on scattering between co-propagating modes in waveguides or resonators.

Herein is disclosed, in one embodiment, a nonreciprocal device including a waveguide through which waves at a first frequency propagate with a first wavevector and with a second wavevector in a direction opposite to the first wavevector. The nonreciprocal device further includes a frequency-dependent device that operates within a frequency range and modifies the waves that propagate through the waveguide in a way that is dependent on the first frequency. The nonreciprocal device further includes a set of couplers to couple the waveguide and the frequency-dependent device. Coupling rates of the set of couplers may be modulated to enable nonreciprocal coupling, with respect to the frequency-dependent device, of the first wavevector compared to the second wavevector. With such non-reciprocal coupling, the first wavevector may interact with the frequency-dependent device and the second wavevector may pass through the waveguide without interacting with the frequency-dependent device (or vice versa).

Figure 1A:
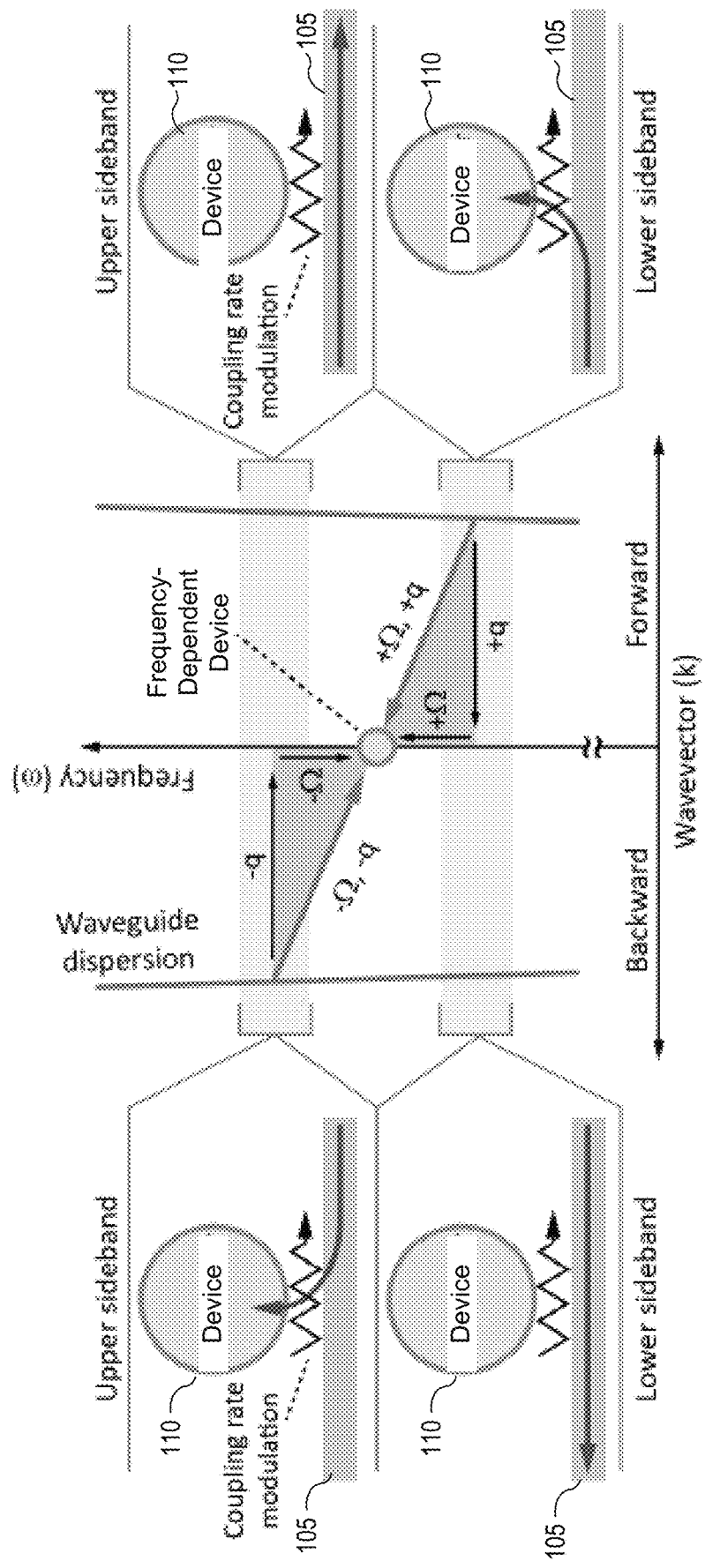
FIG. 1A is a wavevector-based diagram of nonreciprocal coupling as a result of spatiotemporal modulation of coupling rate between a phase-mismatched waveguide and a frequency-dependent device according to an embodiment.

FIG. 1A is a wavevector-based diagram of nonreciprocal coupling as a result of spatiotemporal modulation of coupling rate between a waveguide 105, which is phase-mismatched, and a frequency-dependent device 110 according to an embodiment. This coupling occurs when the frequency and wavevector difference between the waveguide mode and resonator mode are matched by the frequency and wavevector of the spatiotemporal modulation. This coupling is inherently nonreciprocal: the forward (right-traveling) guided mode only couples to the resonator at the lower sideband frequency ($\omega_0 - \Omega$), and the backward (left-traveling) guided mode only couples to the resonator at the upper sideband frequency ($\omega_0 + \Omega$).

In an optical waveguide, for purposes of explanation, a guided mode is a mode with a non-zero wavevector whose field decays monotonically in the transverse direction everywhere external to the core and which does not lose power to radiation. A stationary resonant mode may be understood as a mode in which waves within the waveguide are standing waves, with a wavevector of magnitude zero, at a resonance frequency of the waveguide.

FIG. 1A also illustrates that indirect transitions can also be induced between a guided mode and a stationary resonant mode when the coupling rate between these modes is spatiotemporally modulated in a manner that emulates a propagating acoustic wave, i.e., a traveling wave with a large wavevector. These indirect transitions effectively generate nonreciprocal coupling between the guided and resonant modes, as only one propagation direction is coupled to the resonance of the frequency-dependent device 110. Through nonreciprocal coupling, reconfigurable nonreciprocal transfer functions may be arranged using conventional waveguides and frequency-dependent devices such as resonators (including microstrip resonator), networks of coupled resonators, antennas, amplifiers, oscillators, sensors, and the like.

Figure 1B:
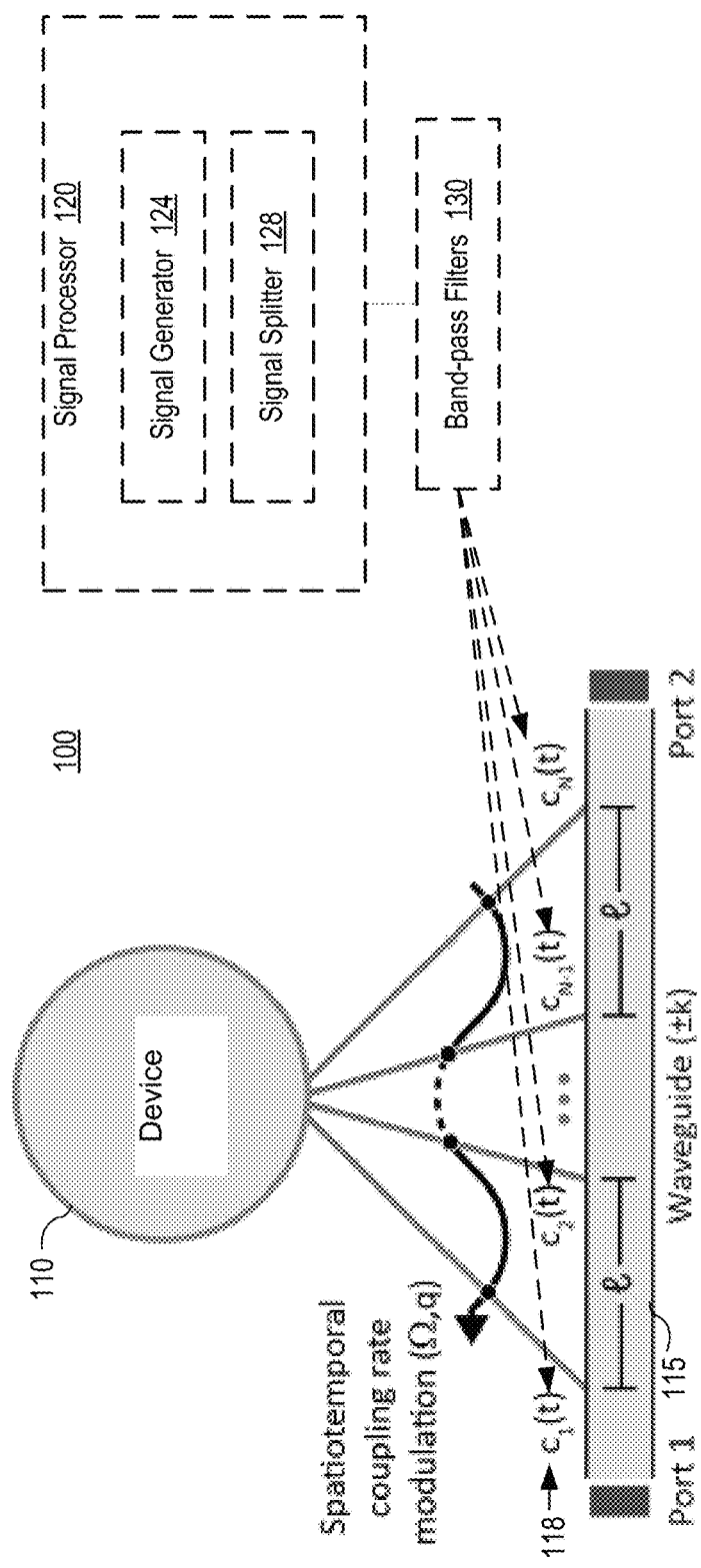
FIG. 1B is a diagram of nonreciprocal device having a frequency-dependent device and a two-port waveguide coupled at multiple spatially separated sites according to an embodiment.

FIG. 1B is a diagram of a nonreciprocal system 100 having the frequency-dependent device 110 and a two-port waveguide 115 coupled at multiple spatially separated sites with multiple couplers 118, according to an embodiment. In one embodiment, the multiple couplers 118 may be evenly separated by a defined distance, l, and may be modulated at a coupling rate that varies with time, e.g., $c_1(t)$, $c_2(t)$, ... $c_N(t)$. As will be discussed in more detail, the defined distance may be set to, in part, create a phase mismatch between the waveguide and the frequency dependent device and ensure that nonreciprocal coupling occurs in the system.

In various embodiments, the destructive interference between coupling sites of the couplers 118 may be exploited to create a phase mismatch between the waveguide 115 and the frequency-dependent device 110. Furthermore, time-modulation of the coupling rate at each coupling site may emulate the effect of propagating acoustic waves and can re-enable interactions between the frequency-dependent device 110 and only one propagation direction within the waveguide, as illustrated in FIG. 1A. The form of the spatiotemporal coupling rate modulation is depicted in FIG. 1B.

There is a difference between indirect transitions among co-propagating modes and nonreciprocal coupling between a guided and resonant mode. In a closed (lossless) system, the co-propagating modes of a waveguide or resonator are orthogonal. These modes are not coupled unless a bias is applied that breaks their orthogonality. In contrast, resonant modes often couple to guided modes. This coupling is reciprocal, making it undesirable in systems utilizing non-reciprocal coupling. To ensure that nonreciprocal coupling occurs in the disclosed system, the system may be constructed such that there is a phase mismatch between the guided and resonant modes.

With continued reference to the upper sideband portions of FIG. 1A, when light arrives from the right, its frequency and wavevector are both decreased by the spatiotemporally modulated coupling and the light can enter the frequency-dependent device 110. In contrast, when light arrives from the left, the same frequency and wavevector shifts result in an overall increase in the light's wavevector amplitude such that the light cannot enter the frequency-dependent device 110. This asymmetry in the light's total wavevector is the fundamental principle behind nonreciprocal coupling.

With continued reference to FIG. 1B, the non-reciprocal system 100 may optionally include a signal processor 120, which may include a signal generator 124 and a signal splitter 128. The signal generator 124 may generate a sinusoidal signal, which the signal splitter 128 may split into two independently-controlled alternating current (AC) signals. The signal processor 120 may modulate these AC signals going to the multiple couplers 118 at respective coupling rates, $c_1(t), c_2(t), \ldots c_N(t)$, to enable nonreciprocal coupling, with respect to the frequency-dependent device, of the first wavevector compared to the second wavevector for waves propagating through the waveguide 115. The nonreciprocal system 100 may further include band-pass filters 130, one for each coupler 118, to isolate lower-frequency bias modulation of the signal processor 120 from a higher frequency of the frequency-dependent device 110. The signal processor 120 and band-pass filters 130 are optional to the extent that some couplers 118 may be modulated in other ways such as via a laser signal, an acoustic wave, or the like.

The requisite coupling rate modulation in microwave frequency microstrip circuits may be realized by sinusoidally modulating the capacitance of spatially-separated variable capacitors (e.g., varactor diodes), as particular examples of the couplers 118. Several distinct nonreciprocal effects are demonstrated, including extreme isolation contrast (greater than 82 dB), nonreciprocal phase shifts, and higher-order nonreciprocal filters, as will be discussed.

In one embodiment, the signal processor 120 may generate a sinusoidal signal, and apply a phase offset within the sinusoidal signal of the second coupler as compared to the first coupler, to induce nonreciprocal coupling, with respect to the frequency-dependent device, of the first wavevector compared to the second wavevector. In various embodiments, to apply the phase offset, the signal processor may include a phase shifter to change the phase of the sinusoidal signal applied to the second coupler compared to the sinusoidal signal being applied to the first coupler. In one embodiment, the frequency of the variation in coupling rate between couplers is higher than the frequency range (e.g., bandwidth) of the frequency-dependent device 110. This may ensure that coupling rates of the upper sideband and the lower sideband do not overlap, to cause nonreciprocal behavior as illustrated in FIG. 1A.

In some embodiments, the two-port waveguide 115 includes a frequency-dependent propagation constant k and the frequency-dependent device 110 supports a single mode at angular frequency $\omega_0$. The frequency-dependent device 110 may be side-coupled to the waveguide 115 with the couplers 118 at N independent sites that are evenly separated on the waveguide by a constant length l. For simplicity and for purposes of the below derivations, assume that each coupling site is located at approximately the same location on the resonator, and that the waveguide is lossless and only supports a single mode. We define forward propagation in the waveguide from port 1 toward port 2.

Figure 1C:
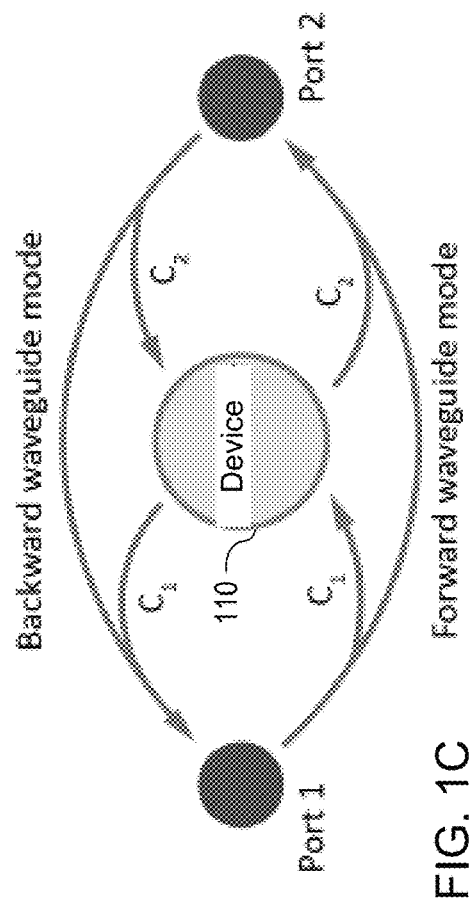
FIG. 1C is a schematic diagram of coupling constants C1 and C2 between ports of the waveguide and the frequency-dependent device illustrated in FIG. 1B according to an embodiment.

The nonreciprocal system 100 may be characterized by analyzing the coupling between the waveguide and the frequency-dependent device 110 using the framework of temporal coupled-mode theory. Since each coupling site is independent, the coupling constants $C_1$ and $C_2$ between the waveguide and resonator (see FIG. 1C) are evaluated as a superposition of the contributions from each site, $$C_1 = \sum_{n=1}^{N} c_n e^{-ikl(n-1)}, \quad C_2 = \sum_{n=1}^{N} c_n e^{ikl(n-1)}, \tag{1}$$

where $c_n$ is the coupling constant at the $n^{th}$ site. The exponential term in these definitions accounts for propagation in the waveguide between adjacent coupling sites spaced by l, and differs between $C_1$ and $C_2$ due to the opposite propagation directions. The coupling constants are also related to the device's decay, which can be described by the decay rate $\gamma = (\kappa_0 + \kappa_{ex})/2$. Here, $\kappa_i$ is the intrinsic decay rate of the frequency-dependent device 110 and $\kappa_{ex} = |C_1|^2 + |C_2|^2$ is the external decay rate due to coupling with the waveguide.

Equation (1) reveals that the contribution from the $n^{th}$ coupling site carries a phase kl(n-1). When summed, these contributions interfere such that the maximum coupling rate occurs only if all N contributions are in-phase (phase matched coupling). The coupling rate decreases away from this maximum and reaches zero when the contributions perfectly destructively interfere. In the case of a complete phase mismatch, $\kappa_{ex} = 0$, where the frequency-dependent device 110 cannot be excited by (or decay to) the waveguide. Since phase matching in this system is determined by the product kl, it is possible, by selecting the appropriate l, to produce a waveguide and frequency-dependent device that do not interact using any arbitrary waveguide and resonator.

With continued reference to FIGS. 1A-1B, a waveguide and frequency-dependent device that are phase mismatched can be coupled together through spatiotemporal modulation of the coupling rate. Consider a coupling rate modulation having angular frequency $\Omega$, wavevector q, and amplitude $\delta_c$, such that the coupling rate at the $n^{th}$ site is $$c_n = c_0 + \delta_c \cos(\Omega t - ql(n-1)). \tag{2}$$

The product ql is equivalent to a phase offset on the modulation applied to adjacent sites, thus any wavevector q can be selected by modulating each site with a phase offset $\theta_n = ql(n-1)$. This spatiotemporal modulation of the coupling rate breaks time-reversal symmetry, and thus induces nonreciprocal coupling, if the wavevector q satisfies $ql \neq z\pi$, where z is an integer. This condition is equivalent to requiring non-stationary spatiotemporal modulation, since if $ql=z\pi$, a standing wave is formed.

When this spatiotemporally modulated coupling is substituted into Equation (1) it is instructive to separate the resulting terms into frequency components as follows:

$$C_1 = \underbrace{c_0 \sum_{n=1}^{N} e^{-ikl(n-1)}}_{C_1^0} + \underbrace{\frac{\delta_c}{2} e^{i\Omega t} \sum_{n=1}^{N} e^{-i(k+q)l(n-1)}}_{C_1^+} + \underbrace{\frac{\delta_c}{2} e^{-i\Omega t} \sum_{n=1}^{N} e^{-i(k-q)l(n-1)}}_{C_1^-}, \quad (3)$$

$$C_2 = \underbrace{c_0 \sum_{n=1}^{N} e^{ikl(n-1)}}_{C_2^0} + \underbrace{\frac{\delta_c}{2} e^{i\Omega t} \sum_{n=1}^{N} e^{i(k-q)l(n-1)}}_{C_2^+} + \underbrace{\frac{\delta_c}{2} e^{-i\Omega t} \sum_{n=1}^{N} e^{i(k+q)l(n-1)}}_{C_2^-}. \quad (4)$$

For brevity, from here onwards we refer to the terms that make up the coupling constants as $C_m = C_m^0 + C_m^+ + C_m^-$ for m=1,2. The first term $C_m^0$ does not depend on the modulation amplitude $\delta_c$ and describes coupling which would occur without modulation. The remaining terms only describe coupling enabled by interactions with the coupling modulation: $C_m^+$ corresponds to coupling where incoming light shifts up in frequency, and $C_m^-$ corresponds to coupling where incoming light shifts down in frequency. Due to energy and momentum conservation, both terms incorporate a frequency shift ($e^{\pm i\Omega t}$) and wavevector shift ($k\pm q$) as depicted in FIG. 1A. The wavevector shift modifies the original phase matching condition and can enable coupling to the frequency-dependent device 110 which would otherwise be phase mismatched.

Coupling to the frequency-dependent device 110, including coupling enabled by spatiotemporal modulation of the coupling rate, has an impact on wave transmission through the waveguide due to resonant absorption or reflection. In the nonreciprocal system 100, the steady-state forward transmission coefficient ($S_{21}$) as a function of frequency $\omega$ is evaluated (see the next section for a complete derivation) to be $$S_{21} = e^{-ikl(N-1)} - \frac{C_2^0 C_1^0}{i(\omega - \omega_0) + \gamma} - \frac{C_2^- C_1^+}{i(\omega + \Omega - \omega_0) + \gamma} - \frac{C_2^+ C_1^-}{i(\omega - \Omega - \omega_0) + \gamma}. \quad (5)$$

Here, $S_{21}$ is a linear transfer function and terms corresponding to transmission with a frequency shift have been dropped. The steady-state backward transmission coefficient ($S_{12}$) is similarly $$S_{12} = e^{-ikl(N-1)} - \frac{C_1^0 C_2^0}{i(\omega - \omega_0) + \gamma} - \frac{C_1^- C_2^+}{i(\omega + \Omega - \omega_0) + \gamma} - \frac{C_1^+ C_2^-}{i(\omega - \Omega - \omega_0) + \gamma}. \quad (6)$$

From the above equations we find that the coupling enabled by spatiotemporal modulation results in a distinct transmission spectrum where resonant absorption can occur at the original resonance frequency $\omega_0$ as well as the shifted frequencies $\omega_0 \pm \Omega$. Since the sideband coupling constants are not required to be equal, i.e. $C_1^+ \neq C_2^+$, transmission at these sidebands can be strongly nonreciprocal. Additionally, we note that absorption at the sidebands is in general asymmetric due to the frequency dependence of k.

Figure 2:
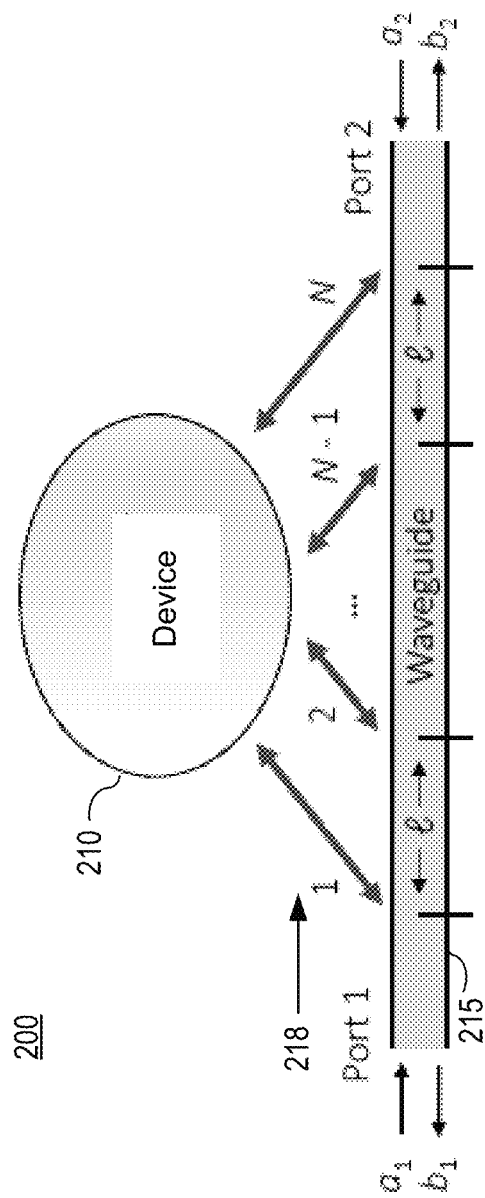
FIG. 2 is a schematic diagram a frequency-dependent device having a resonance and a waveguide having two ports according to an embodiment.

The nonreciprocal scattering parameters for a system such as the nonreciprocal system 100 with multiple spatiotemporally modulated couplers may be derived as follows. FIG. 2 is a schematic diagram of a waveguide-device system 200 with a frequency-dependent device 210 having a resonance and a waveguide 215 having two ports according to an embodiment. The system also includes multiple couplers 218, which in one embodiment, may be the couplers 118 (FIG. 1B). The input and output at port m is described by $a_m$ and $b_m$, respectively, and the resonant field is described by $\alpha$. The ports are coupled directly via the waveguide 215 and are also coupled to a resonant modes using a system of N spatiotemporally modulated coupling sites with coupling rate $c_n$. The individual sites are spatially distributed over the waveguide with sub-wavelength spacing l in order to generate sensitivity to wave propagation direction.

More particularly, the system 200 may be defined with input and output fields $a_m$ and $b_m$ (where m is the port number) and by a resonant mode with angular frequency $\omega_0$ and amplitude $\alpha$. The mathematical derivations herein are an extension of temporal coupled-mode theory modified to incorporate time-varying couplers. We begin with the differential equation describing the resonant field $\alpha$ of a standing-wave resonator in the time-domain with inputs $a_1$ and $a_2$ that are time-harmonic with frequency $\omega$.

$$\dot{\alpha} = (i\omega_0 - \gamma)\alpha + iC_1 a_1 + iC_2 a_2. \quad (7)$$

This equation can be modified for a traveling wave resonator (such as an optical whispering-gallery mode resonator) by splitting $\alpha$ into two orthogonal modes which are each only coupled to a single port.

$$\dot{\alpha}_1 = (i\omega_0 - \gamma)\alpha_1 + iC_1 a_1,$$

$$\dot{\alpha}_2 = (i\omega_0 - \gamma)\alpha_2 + iC_2 a_2. \quad (8)$$

We can express the output fields $b_2$, $b_1$ as $$b_2 = e^{-ikl(N-1)} a_1 + iC_2 \alpha_{(1)},$$

$$b_1 = e^{-ikl(N-1)} a_2 + iC_1 \alpha_{(2)}, \quad (9)$$

where the subscript of $\alpha$ is used only for the traveling wave resonator case. In these equations, $\omega_0$ is the resonance frequency, $\gamma$ is the decay rate of the mode, and $C_m$ is the effective coupling between port m and the resonant mode. We assume the waveguide 215 is matched to the ports and is lossless with a propagation constant k. The couplers 218 are spatially separated in the waveguide by a length l, which leads to the term $e^{-ikl(N-1)}$ to account for the phase associated with a wave traveling between ports. At steady state the solution to Equation (7) (a standing wave resonator) is $$\alpha = i\frac{C_1 a_1 + C_2 a_2}{i(\omega - \omega_0) + \gamma}. \quad (10)$$

We can then rewrite Equation (9) as $$b_2 = \left( e^{-ikl(N-1)} a_1 - \frac{C_2 C_1 a_1 + C_2 C_2 a_2}{i(\omega - \omega_0) + \gamma} \right), \quad (11)$$

-continued $$b_1 = \left(e^{-ik\ell(N-1)}a_2 - \frac{C_1C_1a_1 + C_1C_2a_2}{i(\omega - \omega_0) + \gamma}\right).$$

In the waveguide-device system 200 of FIG. 2, the effective coupling rates $C_1$ and $C_2$ can be written as $$C_1 = \sum_{n=1}^{N} c_n e^{-ik\ell(n-1)},$$

$$C_2 = \sum_{n=1}^{N} c_n e^{ik\ell(n-1)}, \quad (12)$$

where the coupling rate of each individual coupler $c_n$ is modulated with the function $c_n = c_0 + \delta_c \cos(\Omega t - ql(n-1))$. Under this modulation, the effective coupling rates $C_1$ and $C_2$ can be expressed as $$C_1 = c_0 \sum_{n=1}^{N} e^{-ik\ell(n-1)} + \quad (13)$$
$$\frac{C_1^+}{\frac{\delta_c}{2}e^{i\Omega t}\sum_{n=1}^{N}e^{-i(k+q)\ell(n-1)}} + \frac{C_1^-}{\frac{\delta_c}{2}e^{-i\Omega t}\sum_{n=1}^{N}e^{-i(k-q)\ell(n-1)}},$$

$$C_2 = c_0\sum_{n=1}^{N}e^{ik\ell(n-1)} + \quad (14)$$
$$\frac{C_2^+}{\frac{\delta_c}{2}e^{i\Omega t}\sum_{n=1}^{N}e^{i(k-q)\ell(n-1)}} + \frac{C_2^-}{\frac{\delta_c}{2}e^{-i\Omega t}\sum_{n=1}^{N}e^{i(k+q)\ell(n-1)}}.$$

For simplicity, assume a resonant mode with only one input ($a_1 \neq 0$, $a_2 = 0$), which could be a standing wave or traveling wave resonator. The steady-state field in the frequency-dependent device 210 is thus $$\alpha = a_1\left[\frac{iC_1^0}{i(\omega - \omega_0) + \gamma} + \frac{iC_1^+}{i(\omega + \Omega - \omega_0) + \gamma} + \frac{iC_1^-}{i(\omega - \Omega - \omega_0) + \gamma}\right]. \quad (15)$$

The time-varying terms ($C_1^\pm$) represent sidebands of the resonance created by the modulated coupling, which allow waves with a frequency offset $\Omega$ from the resonance frequency to couple into the resonance. We can now find the steady-state fields $b_2$ and $b_1$ (also with $a_2 = 0$) as $$b_2 = \quad (16)$$
$$a_1\left(e^{-jk\ell(N-1)} - \frac{C_2^0C_1^0}{j(\omega-\omega_0)+\gamma} - \frac{C_2^+C_1^0}{j(\omega-\omega_0)+\gamma} - \frac{C_2^-C_1^0}{j(\omega-\omega_0)+\gamma} - \right.$$
$$\frac{C_2^0C_1^+}{j(\omega+\Omega-\omega_0)+\gamma} - \frac{C_2^+C_1^+}{j(\omega+\Omega-\omega_0)+\gamma} - \frac{C_2^-C_1^+}{j(\omega+\Omega-\omega_0)+\gamma} - $$
$$\left.\frac{C_2^0C_1^-}{j(\omega-\Omega-\omega_0)+\gamma} - \frac{C_2^+C_1^-}{j(\omega-\Omega-\omega_0)+\gamma} - \frac{C_2^-C_1^-}{j(\omega-\Omega-\omega_0)+\gamma}\right),$$

$$b_1 = \quad (17)$$
$$a_1\left(e^{-jk\ell(N-1)} - \frac{C_1^0C_1^0}{j(\omega-\omega_0)+\gamma} - \frac{C_1^+C_1^0}{j(\omega-\omega_0)+\gamma} - \frac{C_1^-C_1^0}{j(\omega-\omega_0)+\gamma} - \right.$$
$$\frac{C_1^0C_1^+}{j(\omega+\Omega-\omega_0)+\gamma} - \frac{C_1^+C_1^+}{j(\omega+\Omega-\omega_0)+\gamma} - $$
$$\frac{C_1^-C_1^+}{j(\omega+\Omega-\omega_0)+\gamma} - \frac{C_1^0C_1^-}{j(\omega-\Omega-\omega_0)+\gamma} - $$
$$\left.\frac{C_1^+C_1^-}{j(\omega-\Omega-\omega_0)+\gamma} - \frac{C_1^-C_1^-}{j(\omega-\Omega-\omega_0)+\gamma}\right).$$

From the output field $b_2$, the transmission coefficient $S_{21} = b_2/a_1$ and reflection coefficient $S_{11} = b_1/a_1$ can be found (with $a_2 = 0$). The reverse transmission coefficient $S_{12}$ can be found as $S_{12} = b_1/a_2$ (with $a_1 = 0$). Since each term $C_{1,2}^\pm$ carries a $\pm\Omega$ frequency shift, one can understand the system 200 as taking one input and splitting it into five frequencies separated by the modulation frequency $\Omega$. Presently, we wish to only consider the solution where output terms are the same frequency $\omega$ as the input terms. These are the terms that are measured on a typical network analyzer, while terms that are frequency offset can effectively be dismissed as noise produced by the system 200. We then obtain an equation for $S_{21}$ without any frequency shifted terms:

$$S_{21} = \quad (18)$$
$$e^{-ik\ell(N-1)} - \frac{C_2^0C_1^0}{i(\omega-\omega_0)+\gamma} - \frac{C_2^-C_1^+}{i(\omega+\Omega-\omega_0)+\gamma} - \frac{C_2^+C_1^-}{i(\omega-\Omega-\omega_0)+\gamma}.$$

The decay rate $\gamma$ defines the resulting modal linewidth and is present in the denominator of all the S-parameter equations for our nonreciprocal time-varying coupler. For a lossless resonator $\gamma$ is defined as $$2\gamma = C_1C_1^* + C_2C_2^*, \quad (19)$$

which can be extended to lossy resonators through the addition of the intrinsic decay rate $\kappa_i$. We note that for a traveling wave resonance only the $C_m$ term coupling the resonant field to the output field $b_m$ in Equation (9) is used. The system 200 may have time-varying $C_m$, so one may slightly modify this definition to $$2\gamma = \langle C_1C_1^* + C_2C_2^* + \kappa_i \rangle \quad (20)$$

where $\langle \rangle$ represents the time-average. This approximation is valid when $\gamma \ll \Omega$ (resolved sideband regime) and the field in the resonator decays slowly compared to the modulation. The expression for $\gamma$ can then be simplified to $$2\gamma = (C_1^0)^2 + (C_1^+)^2 + (C_1^-)^2 + (C_2^0)^2 + (C_2^+)^2 + (C_2^-)^2 + \kappa_i. \quad (21)$$

FIG. 3A is an image of an experimental microstrip circuit 300 for testing nonreciprocal resonant absorption from nonreciprocal coupling between a microstrip waveguide 315 and a stub resonator 310 according to an embodiment. The microstrip circuit 300 further includes a set of band-pass filters as 330A, 330B, and 330C strategically integrated at locations along the stub resonator 310 to isolate lower-frequency bias modulation from a higher frequency of the frequency-dependent device.

To experimentally validate the above discussed theories, one may implement a waveguide-resonator system with three coupling sites (N=3) using the microstrip waveguide 318 and the stub resonator 310. The fabricated resonator has a loaded resonant frequency $\omega_0/2\pi \approx 1.4$ GHz. In one embodiment, the waveguide and resonator are coupled through the three couplers 318, which may be variable capacitors, e.g., varactor diodes for the present experiments. This design enables dynamic control over the coupling constants $c_n$, as explained above. We design the coupling site separation such that $kl=2\pi/3$ at $\omega=\omega_0$, resulting in a complete phase mismatch. When the coupling rate is not spatiotemporally modulated, the measured response for this circuit (illustrated in FIG. 3B) does not indicate any dips in transmission corresponding to resonant absorption, confirming that interactions between the resonator and waveguide are suppressed by the phase mismatch. The broadband background transmission losses are caused by reflection from and losses in the capacitive coupling network of the three couplers 318.

We next apply spatiotemporal modulation with frequency $\Omega/2\pi=104$ MHz and momentum $q=-k$ at $\omega=\omega_0+\Omega$, implemented through a phase offset $$\theta_n = \frac{5\pi}{3}(n-1),$$

to the coupling rate at each coupling site as described by Equation (2). This wavevector q was empirically tuned to maximize the coupling rate $C_1^+C_2^-$ between the resonator and backward waveguide mode at the upper sideband. From Equation (5) we see that, neglecting any frequency dependence, $C_1^+C_2^-$ also describes coupling for the forward waveguide mode at the lower sideband. Thus resonant absorption should occur nonreciprocally: at the upper sideband for backward transmission and at the lower sideband for forward transmission. The coupling rate $C_2^+C_1^-$ is simultaneously minimized by this choice of wavevector q, so no absorption is expected at these frequencies for the opposite directions (upper sideband for forward transmission and lower sideband for backward transmission).

FIG. 3C is a graph of spatiotemporal modulation with wavevector q applied such that $-k(\omega_0+\Omega)-q=0$, enabling nonreciprocal coupling to the resonator of FIG. 3A according to an embodiment. FIG. 3D is a wavevector-based graph illustrating the resonance being broadened in k-space, since the finite number of coupling sites (N=3) only completely destructively interfere for $$k = \pm\frac{2\pi}{3\ell}.$$

FIG. 3D also illustrates how the nonreciprocal coupling occurs to the broadened resonator, where the horizontally-slanted arrows represent the wavevector/frequency of the spatiotemporal modulation which is added (or subtracted) to (or from) the waves in the waveguide. The measured forward ($S_{21}$) and backward ($S_{12}$) transmission coefficients for this system are illustrated in the graph of FIG. 3C. As predicted, resonant absorption occurs at $\approx 1.3$ GHz only in the forward direction and at $\approx 1.5$ GHz only in the backward direction. The frequency dependence of k creates a slight phase mismatch at the lower sideband, resulting in reduced absorption. The measured absorption is highly nonreciprocal, no resonant absorption is observed at $\approx 1.3$ GHz in the backward direction or at $\approx 1.5$ GHz in the forward direction, validating that $C_1^-=C_2^+\approx 0$.

In this experiment, we have shown that spatiotemporal modulation of the coupling rate at spatially separated coupling sites can facilitate coupling between a phase mismatched waveguide and resonator by modifying the original phase matching condition. Such modulation-assisted coupling results in nonreciprocal transmission if this modified phase matching condition is not satisfied for both directions simultaneously. However, modulation that does not modify the phase matching condition, e.g., stationary modulation (q=0), may also enable coupling to a phase mismatched resonator due to the frequency dependence of k. This case, which is experimentally illustrated in FIGS. 3E and 3F, demonstrates that both waveguide directions can couple to a phase mismatched resonator simultaneously, resulting in reciprocal transmission, where the vertical arrows in FIG. 3F represent the wavevector/frequency of the spatiotemporal modulation which is added (or subtracted) to (or from) the waves in the waveguide. Note that because a partial phase mismatch remains, the coupling is weaker at the sidebands and absorption is reduced compared the results illustrated in FIGS. 3C and 3D.

Nonreciprocal devices such as isolators and circulators are tools used for controlling wave propagation and have a wide range of uses, from protecting lasers against reflections to facilitating full duplex communications. The gyrator, a fundamental nonreciprocal building block that introduces a unidirectional $\pi$ phase shift, can be used to produce a variety of nonreciprocal circuits including isolators and circulators. Below, we experimentally show how both isolators and gyrators can be directly created through spatiotemporal modulation of the coupling rate between a resonator and waveguide. Additionally, we provide preliminary experimental evidence of a four-port circulator implemented using spatiotemporal modulation of the coupling rate between a resonator and two waveguides.

FIGS. 4A, 4B, 4C, 4D, 4E, 4F are graphs illustrating experimental demonstration of nonreciprocal functions in which nonreciprocal coupling is enabled by spatiotemporal modulation of the coupling rate with the wave wavevector q, but varying amplitude, according to various embodiments. All measurements are focused on the upper sideband. We first consider the case of an isolator with high transmission amplitude in the forward direction and zero transmission in the backward direction, operating at the upper sideband frequency $\omega_0+\Omega$. Examining Equations (5) and (6), we find that this case occurs when $C_1^+C_2^-=\gamma$ (the critical coupling condition) and when $C_2^+C_1^-=0$. We experimentally investigated this case using the circuit shown in FIG. 3A.

The resonance frequency was tuned to $\omega_0/2\pi\approx 1.42$ GHz, and spatiotemporal modulation was again applied to the coupling with frequency $\Omega/2\pi=104$ MHz and $q=-k(\omega_0+\Omega)$. The modulation amplitude $\delta_c$ was increased until the critical coupling condition $C_1^+C_2^-=\gamma$ was reached. The measured forward ($S_{21}$) and backward ($S_{12}$) transmission coefficients under modulation with this critical amplitude are presented in FIG. 4A. We observe a large Lorentzian dip in the measured backward transmission, which drops to below $-89$ dB at 1.52 GHz. No resonant absorption is visible in the forward direction. The measured isolation contrast, illustrated in FIG. 4B, exceeds 82 dB with a 10 dB bandwidth of approximately 12 MHz.

Figure 4A:
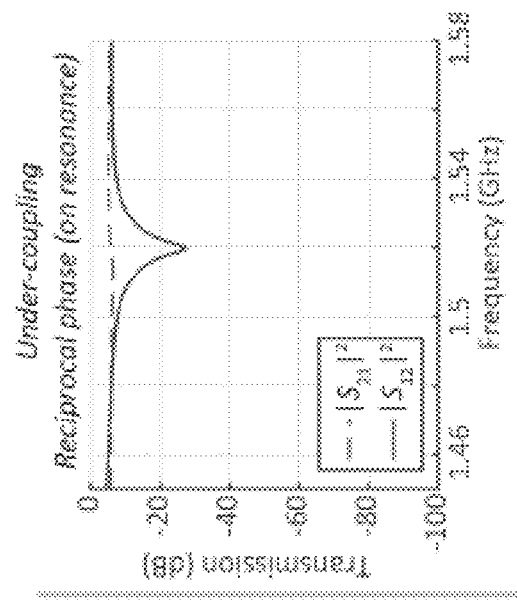
Figure 4C:
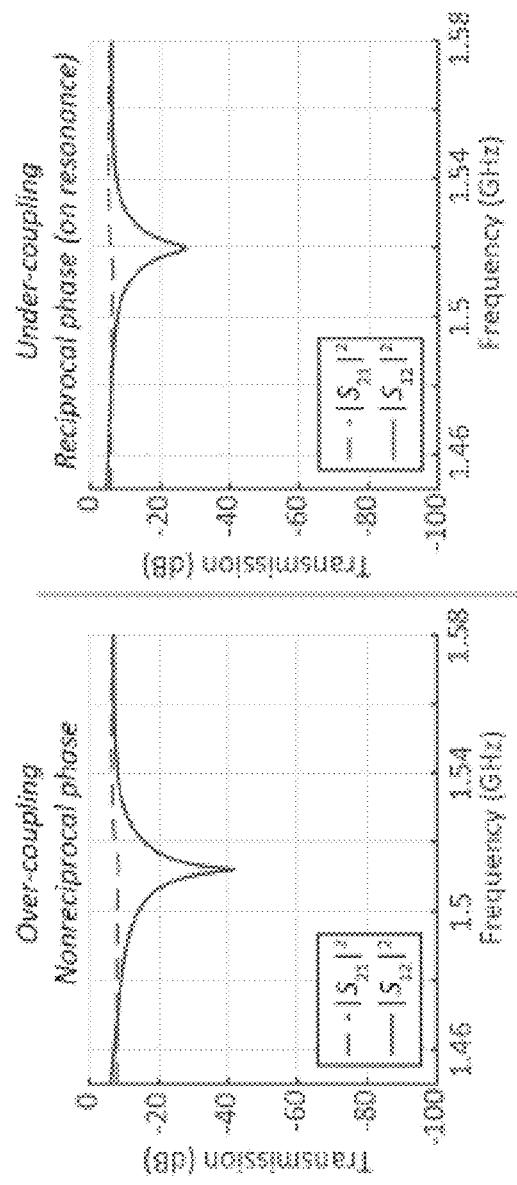
Figure 4E:
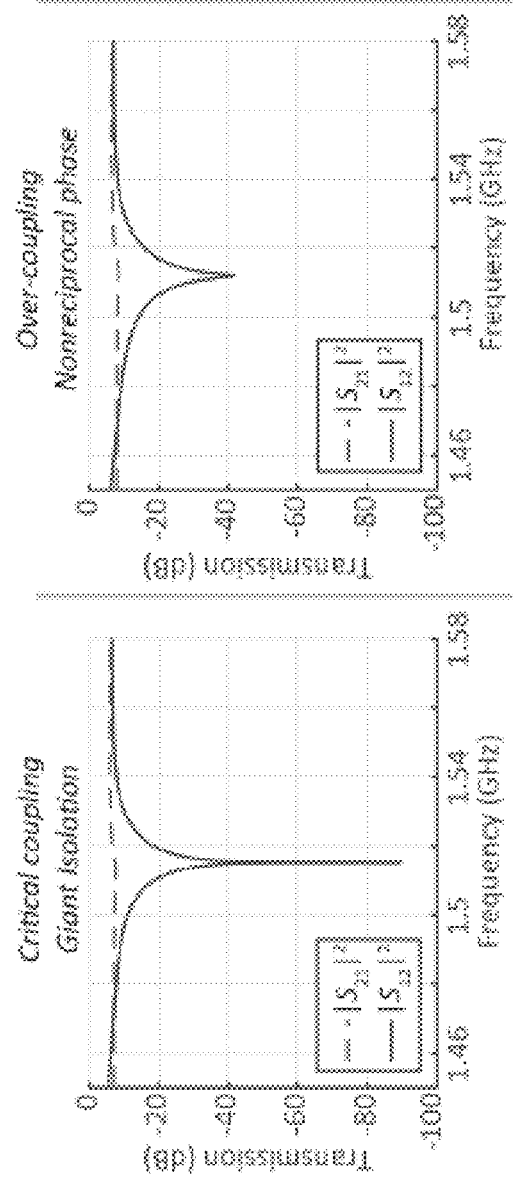
Figure 4B:
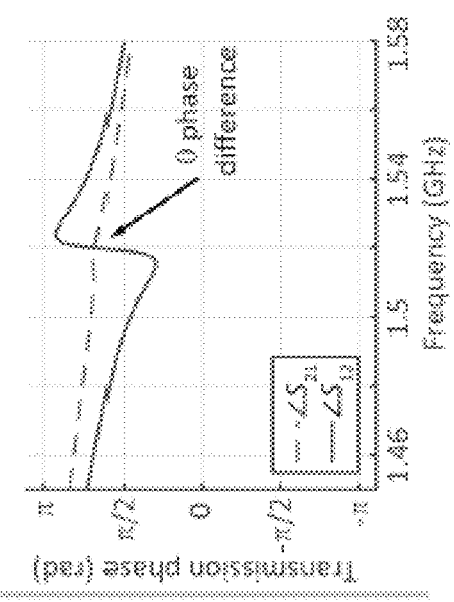
Figure 4D:
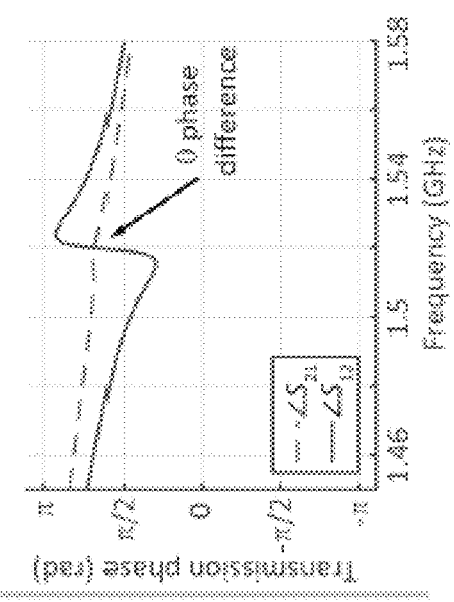
Figure 4F:
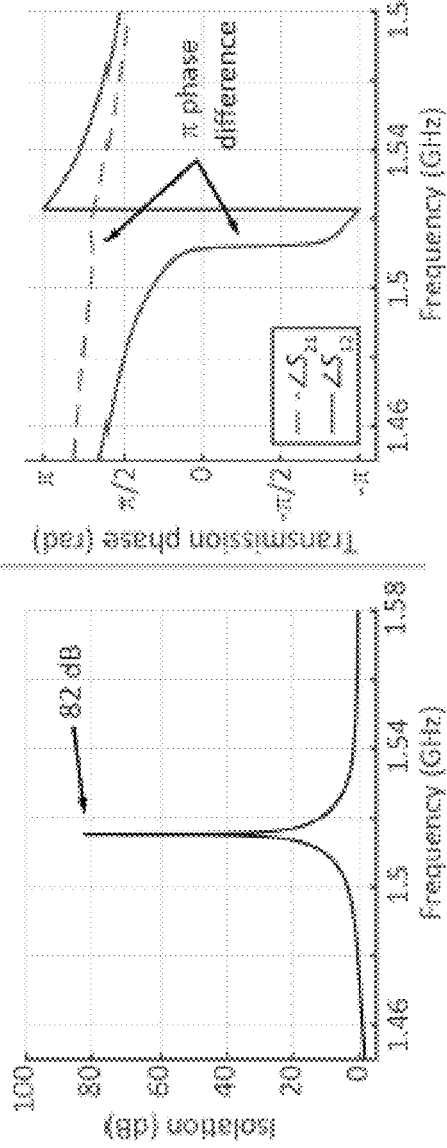

We next analyze the case of a gyrator, where high transmission amplitude occurs in both directions, but the backward transmission is phase shifted by $\pi$ in comparison to forward transmission. Considering the same system as above, it is evident from Equations (5) and (6) that this case occurs if the modulation amplitude is increased such that $C_1^+C_2^-\approx 2\gamma$ (strong over-coupling) while the opposite direction remains uncoupled. We experimentally realize nonreciprocal over-coupling by further increasing the modulation amplitude such that $C_1^+C_2^->\gamma$, and observe the anticipated nonreciprocal $\pi$ phase shift at the upper sideband frequency $\approx 1.52$ GHz, which is illustrated in FIGS. 4C and 4D. Unfortunately, we were unable to realize the required modulation amplitude to achieve $C_1^+C_2^-\approx 2\gamma$ due to limitations caused by non-linearity in the varactor diodes. For comparison, we also show measured transmission amplitude and phase for the under-coupled case, where $C_1^+C_2^-<\gamma$ and there is no nonreciprocal $\pi$ phase shift at the upper sideband, e.g., as illustrated in FIGS. 4E and 4F.

FIG. 5A is a schematic diagram of a pair of waveguides 515A and 515B, and a frequency-dependent device 510, illustrating four corresponding coupling constants according to an embodiment. Using two waveguides and a single frequency-dependent device, it is possible to realize a four-port circulator 500 through nonreciprocal coupling. We introduce additional coupling constants $C_3$ and $C_4$ between the resonator and the ports of the second waveguide (ports 3 and 4) as illustrated in FIG. 5A. For this device, the transmission coefficients between ports 1 and 2 (3 and 4) are the same as in the single waveguide case, and transmission through the resonator takes the form $$S_{31} = -\frac{C_3^0 C_1^0}{i(\omega - \omega_0) + \gamma} - \frac{C_3^- C_1^+}{i(\omega + \Omega - \omega_0) + \gamma} - \frac{C_3^+ C_1^-}{i(\omega - \Omega - \omega_0) + \gamma}, \quad (22)$$

since there is no direct path connecting the ports. We consider a device that functions at the upper sideband frequency.

FIG. 5B is a schematic of the proposed circulator 500 employing the four-port waveguide and frequency-dependent device illustrated in FIG. 5A according to an embodiment. FIG. 5C is a frequency-momentum diagram illustrating nonreciprocal coupling (double-sided arrows) at the upper sideband, as used in the circulator design of FIG. 5B according to an embodiment. If the resonator is critically coupled to the backward direction of each waveguide such that $C_1^+ C_2^- = C_3^+ C_4^- = \gamma$ and $C_1^- C_2^+ = C_3^- C_4^+ = 0$, the scattering matrix takes the form $$|S(\omega_0 + \Omega)|^2 = \begin{pmatrix} 0 & 0 & 0 & 1 \\ 1 & 0 & 0 & 0 \\ 0 & 1 & 0 & 0 \\ 0 & 0 & 1 & 0 \end{pmatrix}, \quad (23)$$

which is the definition of an ideal four-port circulator. Note that due to the additional coupling terms between the resonator and second waveguide, decay of the resonant mode increases proportionally as $$2\gamma = \langle k_1 k_1^* + k_2 k_2^* + k_3 k_3^* + k_4 k_4^* + \kappa_i \rangle. \quad (24)$$

From this equation we can see that this ideal device can only be realized with a lossless resonator ($\kappa_i = 0$) since $2\gamma \geq k_1^+ k_2^- + C_3^+ C_4^- + \kappa_i$, although it can be approximated by making $\kappa_i$ small compared to the coupling rates.

FIG. 6A is an image of a microstrip circuit implementation 600 of the four-port circulator 500 of FIGS. 5A-5B with three coupling sites between each waveguide 515A and 515B and a resonator 610 as the frequency-dependent device 510, according to an embodiment. The three coupling sites may be implemented with two sets of three couplers 515A and 515B for the waveguides 515A and 515B, respectively. Spatiotemporal modulation was applied to each trio of the couplers 618A and 618B with the same bias voltage to ensure symmetric coupling $C_1 = C_3$ and $C_2 = C_4$.

FIG. 6B is a graph illustrating the measured power transmission for the circuit in FIG. 6A according to an embodiment. The measured transmission illustrates clear circulation behavior, with high transmission from ports 1→2, 2→3, 3→4 (not shown), and 4→1, and low transmission in the opposite directions. Because the intrinsic loss rate in the resonator ($\kappa_i$) is not negligible in our experiment (which we assumed for purposes of theory development), we did not achieve the critical coupling condition for ideal circulation. The presence of coupling at the lower sideband and the original resonance frequency, although small, also increases the decay rate as described by Equation (22).

Due to these limitations, the circulator microstrip circuit implementation 600 of the four-port circulator 500 exhibits low contrast between $S_{21}$ and $S_{12}$, and the measured transmission between ports on opposite waveguides is highly lossy. Certain challenges with achieving critical coupling with the circulator may be addressed with a higher Q-factor resonator or by increasing the nonreciprocal coupling rate. Additionally, by increasing the number of coupling sites (N) and thereby making the phase matching condition more strict, coupling at the lower sideband and original resonance frequency can be decreased. The increased number of coupling sites may also increase the nonreciprocal coupling rate, which is proportional to $N^2$. Despite some challenges, the experiment performed provides clear evidence that circulation using nonreciprocal coupling enabled by spatiotemporal coupling rate modulation is possible.

While high-order filters are often necessary for signal processing applications, a platform for integrating such functionality into non-magnetic nonreciprocal systems has not yet been shown. Frequency-selective nonreciprocal devices in literature have been mainly limited to Lorentzian shaped transfer functions. Nonreciprocal coupling is a technique uniquely suited to address this challenge because it can permit unidirectional access to arbitrary band-limited load impedances (FIG. 7A), producing arbitrary nonreciprocal responses. Additionally, different frequency responses could be simultaneously achieved in opposite directions by coupling each direction to a different resonator network configured to achieve the different frequency responses as described herein (FIG. 7B).

FIG. 7C is an image of a microstrip circuit 700 used to demonstrate customizable nonreciprocal transfer functions according to an embodiment. We experimentally demonstrate non-Lorentzian nonreciprocal transfer functions using the microstrip circuit 700, which is a modified version of the microstrip circuit 300 of FIG. 3A. Here, two additional microstrip stub resonators, e.g., a second stub resonator 710A and a third stub resonator 710B, with tunable resonance frequencies are coupled to the first stub resonator 310 used in the microstrip circuit 300, providing six additional degrees of freedom: the additional resonance frequencies $\omega_1$, $\omega_2$, inter-resonator coupling rates $\kappa_1$, $\kappa_2$, and linewidths $\gamma_1$, $\gamma_2$. The second stub resonator 710A may be coupled with a first coupler 718A and the third stub resonator 710B may be coupled with a second coupler 718B, according to the illustrated embodiment.

A maximally flat nonreciprocal filter with constant isolation over an appreciable bandwidth is one of the functionalities that cannot be implemented using a single resonant response. Such a flat response can be approximated in the three resonator network using $\gamma_1 = \gamma_2 = \gamma$, $\kappa_1 = \kappa_2 = 9/14\gamma$, $\omega_1 = \omega_0 + 3/7\gamma$, and $\omega_2 = \omega_0 - 3/7\gamma$, where the loss rate $\gamma$ and resonance frequency $\omega_0$ are associated with the original resonator. We empirically tuned both the resonance frequencies ($\omega_1$, $\omega_2$) and coupling rates ($\kappa_1$, $\kappa_2$) of the additional resonators in our circuit (FIG. 7D) near these values until the desired transfer function was achieved. Because the resonators are fabricated on the same substrate and conductor, their linewidths are intrinsically equal. The experimentally measured transmission through the waveguide, as illustrated in FIG. 7E, exhibits nearly constant isolation of 14 dB over a 10 MHz bandwidth. In FIG. 7F, we present four additional examples of arbitrary nonreciprocal transfer functions obtained by varying the inter-resonator coupling strength and frequency separation of the three resonators. In these experiments we observe consistently flat forward transmission ($S_{21}$) even though the reverse transmission ($S_{12}$) varies, clearly demonstrating that propagation in the uncoupled direction is largely unaffected by changes to the impedance network.

In this work we have demonstrated that coupling to arbitrary networks of resonators can be engaged nonreciprocally, and have used such coupling to realize new higher-order nonreciprocal filters as well as fundamental nonreciprocal devices. Furthermore, we have spatiotemporally modulated the coupling rate with a precisely controlled momentum, replicating the action of optically active acoustic waves without relying on any dispersion relation. Although our experiments take place in microstrip circuits, the nonreciprocal behavior of our system is captured by coupled-mode theory and thus the underlying method can be extended to a wide variety of physical systems. Additionally, the concept of nonreciprocal coupling can be applied broadly to a number of band-limited devices besides resonators, including antennas, amplifiers, oscillators, and sensors, allowing the creation of highly customizable integrated devices.

FIG. 8A is a method 800 for creating and operating a nonreciprocal device with a reconfigurable transfer function formed through nonreciprocal coupling according to an embodiment. In various embodiments, the method 800 may be executed by or with the nonreciprocal system 100, or any nonreciprocal device of the system disclosed herein. The steps of the method 800 may be performed in different orders in various alternative embodiments.

In one embodiment, the method 800 may begin with coupling, using a set of couplers, a waveguide to a frequency-dependent device (810). Waves at a first frequency propagate in the waveguide with a first wavevector and with a second wavevector in a direction opposite to the first wavevector. The frequency-dependent device operates within a frequency range, e.g., within a particular bandwidth. The method 800 may include the frequency-dependent device modifying the waves within the waveguide in a way that is dependent on the first frequency (820). The method 800 may include inducing, via modulation of coupling rates of the set of couplers, nonreciprocal coupling, with respect to the frequency-dependent device, of the first wavevector compared to the second wavevector (830).

In various embodiments, the method 800 may also include separating at least a first coupler and a second coupler, of the set of couplers, at spatially distinct coupling sites between the waveguide and the frequency-dependent device (840). The method 800 may also include causing a coupling rate of each of the first and second couplers to vary with time in way that emulates a sinusoidal traveling wave with the first frequency and one of the first wavevector or the second wavevector (850).

FIG. 8B is a method 860 for creating a nonreciprocal device with a reconfigurable transfer function formed through nonreciprocal coupling according to another embodiment. In various embodiments, the method 860 may be executed by or with the nonreciprocal system 100, or any nonreciprocal device of system disclosed herein. In embodiments, the method 860 may be performed in the context of coupling, using a set of couplers, a waveguide to a frequency-dependent device. Waves at a first frequency propagate in the waveguide with a first wavevector and with a second wavevector in a direction opposite to the first wavevector. The frequency-dependent device operates within a frequency range, e.g., a particular bandwidth.

With additional reference to FIG. 8, the method 860 may being with creating phase mismatched coupling between the waveguide and the frequency-dependent device using a set of multiple couplers by separating at least a first coupler and a second coupler spatially (870). In one embodiment, the multiple couplers may be evenly spatially separated by a defined distance.

The method 860 may continue with inducing nonreciprocal coupling, with respect to the frequency-dependent device, of the first wavevector compared to the second wavevector (880). The inducting this nonreciprocal coupling may be performed by causing the coupling rate of each coupler in the set of couplers to vary with time in a manner that emulates a sinusoidal traveling wave.

The method 860 may continue with modifying, with the frequency-dependent device, the waves within the waveguide in a way that is dependent on the first frequency and on the nonreciprocal coupling rates of the set of couplers (890).

Our microwave circuits are fabricated on Rogers RT/duroid 5880 substrate with a one ("1") oz copper conductor, and include a microstrip waveguide coupled to a ring resonator by N varactor diodes (Skyworks SMV1275) that act as variable capacitors. The coupling strength $c_n$ of each capacitive coupler is an approximately linear function of the applied voltage $V_n$ (for small changes), allowing a modulation of $c_n$ that is proportional to a modulation of $V_n$. We first apply a DC bias to each varactor diode with a DC power supply (Agilent E3631A), which lowers the capacitance and decreases the background reflection caused by the coupling system. On top of this bias, we apply a small sinusoidal signal from a signal generator (HP-8647B), which is set at a frequency of 104 MHz. This signal is split (Minicircuits ZA3CS-400-3 W-S splitter) into three variable phase shifters (Minicircuits JSPHS-150+) so that the phase shift between each signal can be independently controlled. The DC bias and three 104 MHz modulation signals are combined through three (or more) bias tees (Minicircuits ZFBT-4R2GW-FT+) and connected directly to the circuit, through the ports labeled "Bias" in FIG. 3A. On each microstrip circuit 300, butterfly band-pass filters were incorporated along with a another low-frequency biasing tee (Johanson Technology L-14C10N-V4T 10 nH inductor and Johanson Technology R14S 6.8 pF capacitor) as shown in FIG. 3A to isolate the lower frequency (104 MHz) bias modulation from the higher frequency (≈1.4 GHz) resonant circuit.

In one embodiment, and with further reference to FIGS. 1B and 3A, assume the couplers 118 are implemented as varactor diodes at at least two coupling sites, e.g., to include at least a first coupler and a second coupler. The signal processor 120 may modulate a first voltage bias applied to the first coupler to generate a first modulated coupling constant, and a second voltage bias applied to the second coupler to generate a second modulated coupling constant. In embodiments, the combined coupling constant—the sum of at least the first and second modulated coupling constants—is direction sensitive in relation to the direction of the waves within the waveguide. Furthermore, the first and second modulated coupling constants may each contain a set of frequency components including at least one of a positive sideband component or a negative sideband component. In embodiments, the set of frequency components of the first modulated coupling constant has a different phase than the set of frequency components of the second modulated coupling constant.

In various embodiments, the first and second voltage biases are direct current (DC) voltage biases, as discussed above, which may also include AC signal components on top of the DC voltage biases. The signal generator 124 may generate the sinusoidal signal. The signal splitter 128 may split the sinusoidal signal from the signal generator into two independently-controlled alternating current (AC) signals. A first band-pass filter 330A may be coupled between the signal processor 120 and the first coupler and a second band-pass filter 330B may be coupled between the signal processor 120 and the second coupler. The first and second band-pass filters 330A and 330B may isolate lower-frequency bias modulation from a higher frequency of the frequency-dependent device 110, e.g., the stub resonator 310 in our experiments.

We measured the transmission parameters ($S_{21}$, $S_{12}$) of the microstrip circuit 300 using a Keysight E5063A vector network analyzer. The network analyzer measurement was calibrated to the ends of the SMA cables that connected to the surface-mount SMA connectors on the circuit board. Thus, the data presented throughout this paper may only reflect the S parameters of the circuits that we have developed, while eliminating any parasitic effects from the cables and supporting systems.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

What is claimed is:

1. A nonreciprocal device comprising:
   a waveguide through which waves at a first frequency propagate with a first wavevector and with a second wavevector in a direction opposite to the first wavevector;
   a frequency-dependent device that operates within a frequency range and modifies the waves through the waveguide in a way that is dependent on the first frequency; and
   a set of couplers to couple the waveguide and the frequency-dependent device, wherein coupling rates of the set of couplers are modulated to enable nonreciprocal coupling, with respect to the frequency-dependent device, of the first wavevector compared to the second wavevector.

2. The nonreciprocal device of claim 1, wherein the set of couplers comprises at least a first coupler and a second coupler located at spatially distinct coupling sites between the waveguide and the frequency-dependent device, and wherein a coupling rate of each of the first and second couplers is to vary with time.

3. The nonreciprocal device of claim 2, wherein the spatially distinct coupling sites are evenly separated by a defined distance, wherein the defined distance is set to create a phase mismatch between the waveguide and the frequency-dependent device.

4. The nonreciprocal device of claim 2, further comprising at least one of a signal generator, a signal splitter, or a phase shifting circuit coupled to the set of couplers and to modulate the first coupler at the first frequency and the second coupler at a second frequency.

5. The nonreciprocal device of claim 2, wherein the set of couplers further comprises a third coupler located at one of the spatially distinct coupling sites, and wherein separation between the spatially distinct coupling sites is such that the waves in the waveguide cannot enter the frequency-dependent device due to destructive interference of the first frequency within the frequency range.

6. The nonreciprocal device of claim 1, wherein each of the set of couplers is one of a variable capacitor or a varactor diode.

7. The nonreciprocal device of claim 1, wherein the frequency-dependent device comprises one of a resonator, a network of coupled resonators, an antenna, an amplifier, an oscillator, or a sensor.

8. The nonreciprocal device of claim 1, wherein the frequency-dependent device is a microstrip resonator and the waveguide is a microstrip waveguide.

9. The nonreciprocal device of claim 1, wherein the frequency-dependent device and the waveguide operate with one of radio-frequency electromagnetic waves, optical-frequency electromagnetic waves, or acoustic waves.

10. The nonreciprocal device of claim 1, wherein, in response to modulation of the set of couplers, the nonreciprocal device is to operate as one of an isolator, a circulator, a gyrator, a full-duplex antenna, or a nonreciprocal filter.

11. A system comprising:
    a waveguide through which waves at a first frequency propagate with a first wavevector and with a second wavevector in a direction opposite to the first wavevector;
    a frequency-dependent device that operates within a frequency range and modifies the waves through the waveguide in a way that is dependent on the first frequency;
    a set of couplers to couple the waveguide to the frequency-dependent device at spatially separated coupling sites, the set of couplers comprising at least a first coupler and a second coupler; and
    a signal processor coupled to the set of couplers, the signal processor to:
    generate a sinusoidal signal;
    generate a first modulated coupling constant via modulation of a first coupling constant, of the first coupler, using the sinusoidal signal;
    generate a second modulated coupling constant via modulation of a second coupling constant, of the second coupler, using the sinusoidal signal; and
    apply a phase offset of the second modulated coupling constant as compared to the first modulated coupling constant, to induce nonreciprocal coupling, with respect to the frequency-dependent device, of the first wavevector compared to the second wavevector.

12. The system of claim 11, wherein to apply the phase offset, the signal processor is to modulate the first coupler with a first phase and the second coupler with a second phase different than the first phase.

13. The system of claim 11, wherein the spatially separated coupling sites are evenly separated by a defined distance that is set, in view of the first wavevector and the second wavevector, such that the frequency-dependent device is to cause:
- first waves that propagate in a first direction to not be absorbed by the frequency-dependent device; and
- second waves that propagate in a second direction, opposite to the first direction, to be absorbed by the frequency-dependent device.

14. The system of claim 11, wherein each of the set of couplers comprises a varactor diode, and wherein the signal processor is further to:
- modulate a first voltage bias applied to the first coupler to generate the first modulated coupling constant; and
- modulate a second voltage bias applied to the second coupler to generate the second modulated coupling constant, wherein a combination of the first and second modulated coupling constants is direction sensitive in relation to the direction of the waves within the waveguide.

15. The system of claim 14, wherein the signal processor comprises:
- a signal generator to generate the sinusoidal signal; and
- a signal splitter to split the sinusoidal signal from the signal generator into two independently-controlled alternating current (AC) signals, the system further comprising:
  - a first band-pass filter coupled between the signal processor and the first coupler; and
  - a second band-pass filter coupled between the signal processor and the second coupler, wherein the first and second band-pass filters are to isolate lower-frequency bias modulation from a higher frequency of the frequency-dependent device.

16. The system of claim 14, wherein the first and second modulated coupling constants each contain a set of frequency components comprising at least one of a positive sideband component or a negative sideband component, and wherein the set of frequency components of the first modulated coupling constant has a different phase than the set of frequency components of the second modulated coupling constant.

17. A method comprising:
- coupling, using a set of couplers, a waveguide to a frequency-dependent device, wherein waves at a first frequency propagate in the waveguide with a first wavevector and with a second wavevector in a direction opposite to the first wavevector, and wherein the frequency-dependent device operates within a frequency range;
- modifying, with the frequency-dependent device, the waves within the waveguide in a way that is dependent on the first frequency; and
- inducing, via modulation of coupling rates of the set of couplers, nonreciprocal coupling, with respect to the frequency-dependent device, of the first wavevector compared to the second wavevector.

18. The method of claim 17, further comprising:
- separating at least a first coupler and a second coupler, of the set of couplers, at spatially distinct coupling sites between the waveguide and the frequency-dependent device; and
- causing a coupling rate of each of the first and second couplers to vary with time in way that emulates a sinusoidal traveling wave with a second frequency and a third wavevector.

19. The method of claim 18, wherein the third wavevector is one of the first wavevector or the second wavevector.

20. The method of claim 18, wherein a wavevector of the sinusoidal traveling wave is tunable via a phase of the modulation, and wherein the second frequency of the sinusoidal traveling wave is higher than the frequency range of the frequency-dependent device.

21. The method of claim 18, wherein the spatially distinct coupling sites are evenly separated by a defined distance, the method further comprising setting the defined distance to create a phase mismatch between the waveguide and frequency-dependent device.

22. The method of claim 18, wherein the inducing comprises modulating the first coupler and the second coupler at one of the first frequency or a second frequency using at least one of a signal generator, a signal splitter, or a phase shifting circuit.

23. The method of claim 17, further comprising operating the frequency-dependent device with one of radio-frequency electromagnetic waves, optical-frequency electromagnetic waves, or acoustic waves.

* * * * *